(12) United States Patent
Hutter, III

(10) Patent No.: US 10,406,590 B2
(45) Date of Patent: *Sep. 10, 2019

(54) HOLLOW METAL SCREW AND METHOD OF MAKING

(71) Applicant: Physical Systems, Inc., Carson City, NV (US)

(72) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/024,324

(22) PCT Filed: Jul. 7, 2015

(86) PCT No.: PCT/US2015/039447
§ 371 (c)(1),
(2) Date: Mar. 23, 2016

(87) PCT Pub. No.: WO2016/007557
PCT Pub. Date: Jan. 14, 2016

(65) Prior Publication Data

US 2017/0282236 A1 Oct. 5, 2017

Related U.S. Application Data

(63) Continuation of application No. 14/793,651, filed on Jul. 7, 2015, now Pat. No. 9,689,415.
(Continued)

(51) Int. Cl.
*F16B 21/00* (2006.01)
*B21D 53/24* (2006.01)
(Continued)

(52) U.S. Cl.
CPC .............. *B21D 53/24* (2013.01); *B21H 3/02* (2013.01); *B21H 3/04* (2013.01); *B21K 1/46* (2013.01);
(Continued)

(58) Field of Classification Search
CPC ........ F16B 23/00; F16B 35/041; F16B 37/02; F16B 37/14; F16B 37/145
(Continued)

(56) References Cited

U.S. PATENT DOCUMENTS 1,098,716 A    6/1914   Garrison
1,172,406 A *   2/1916   Taylor ................... F16B 37/122
                                                      411/395

(Continued)

OTHER PUBLICATIONS

"A286 technical Data" California Metal & Supply Inc. Captured on May 2, 2013. Retrieved from the Internet on Sep. 11, 2015. <http://www.californiametal.com/A286_Sheet_Plate_Pipe_Tube_Rod_Bar_Tech_Data.htm>.

*Primary Examiner* — Gary W Estremsky
(74) *Attorney, Agent, or Firm* — Lowry Blixseth APC; Scott M. Lowry

(57) ABSTRACT

A hollow screw and related process of making is provided, wherein the hollow screw is formed from a generally circular corrosion resistant stainless steel disk cut from flat roll stock. The hollow screw includes a head and an elongated and hollow shaft having a wall thickness between about 0.2 to about 0.7 millimeters extending therefrom and defining a shank portion and a threaded portion having a plurality of threads thereon with a rotational drive mechanism configured to facilitate tightening via the threads. The process involves annealing to soften the stamped hollow screw, followed by thread rolling, and then age hardening the hollow screw. As such, the resultant hollow screw is relatively lightweight, about 50% the mass of a solid core (Continued)

screw made from the same material, with a sufficient thread strength to meet most aerospace applications and contributes to important aircraft fuel economy.

102 Claims, 19 Drawing Sheets

Related U.S. Application Data

(60) Provisional application No. 62/021,623, filed on Jul. 7, 2014.

(51) Int. Cl.

| | |
|---|---|
| *B21K 1/56* | (2006.01) |
| *B21H 3/02* | (2006.01) |
| *C21D 6/02* | (2006.01) |
| *F16B 23/00* | (2006.01) |
| *C21D 1/26* | (2006.01) |
| *C21D 9/00* | (2006.01) |
| *F16B 35/00* | (2006.01) |
| *B21H 3/04* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/46* | (2006.01) |
| *C22C 38/50* | (2006.01) |
| *C22C 38/54* | (2006.01) |
| *C22C 38/58* | (2006.01) |
| *F16B 33/00* | (2006.01) |
| *F16B 35/04* | (2006.01) |
| *F16B 37/02* | (2006.01) |
| *B21K 1/46* | (2006.01) |
| *C21D 6/00* | (2006.01) |
| *C21D 8/10* | (2006.01) |

(52) U.S. Cl.
CPC ............... *B21K 1/56* (2013.01); *C21D 1/26* (2013.01); *C21D 6/00* (2013.01); *C21D 6/02* (2013.01); *C21D 9/0093* (2013.01); *C22C 38/002* (2013.01); *C22C 38/02* (2013.01); *C22C 38/04* (2013.01); *C22C 38/06* (2013.01); *C22C 38/42* (2013.01); *C22C 38/46* (2013.01); *C22C 38/50* (2013.01); *C22C 38/54* (2013.01); *C22C 38/58* (2013.01); *F16B 23/00* (2013.01); *F16B 33/008* (2013.01); *F16B 35/00* (2013.01); *F16B 35/041* (2013.01); *F16B 37/02* (2013.01); *C21D 6/004* (2013.01); *C21D 8/105* (2013.01); *C21D 2261/00* (2013.01); *F16B 23/0053* (2013.01); *F16B 23/0061* (2013.01); *F16B 23/0092* (2013.01)

(58) Field of Classification Search
USPC ............ 411/371.2, 372, 544, 430, 395, 427; 470/14
See application file for complete search history.

(56) References Cited

U.S. PATENT DOCUMENTS

| | | | | |
|---|---|---|---|---|
| 1,281,174 | A | * 10/1918 | Kraft | F16B 37/14 411/429 |
| 1,957,282 | A | * 5/1934 | Noyack | F16B 37/02 411/427 |
| 2,026,859 | A | * 1/1936 | Baynes | B21D 53/24 411/427 |
| 4,157,725 | A | 6/1979 | Stanaitis | |
| 4,414,466 | A | * 11/1983 | Fischer | H05B 3/68 219/455.11 |
| 4,878,794 | A | 11/1989 | Potucek | |
| 5,711,711 | A | 1/1998 | Schmidt | |
| 2002/0182032 | A1 | 12/2002 | Anderson et al. | |
| 2003/0042737 | A1* | 3/2003 | Sampson | F16B 39/108 285/190 |
| 2005/0220564 | A1 | 10/2005 | Hinson et al. | |
| 2011/0262241 | A1* | 10/2011 | Bosterling | E01B 9/18 411/55 |
| 2013/0195578 | A1 | 8/2013 | Gleason | |

* cited by examiner

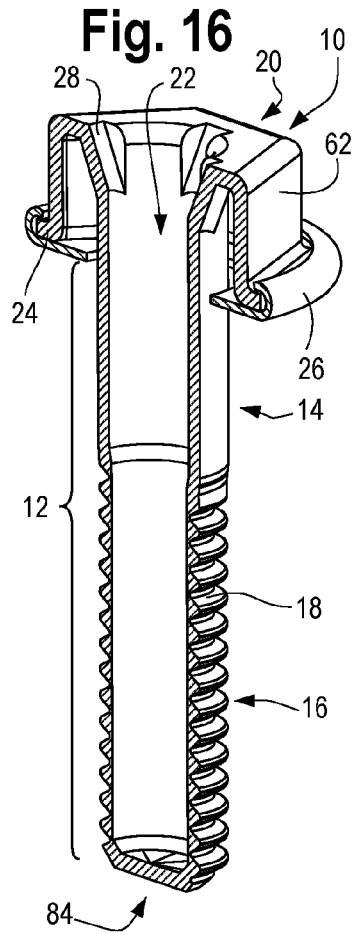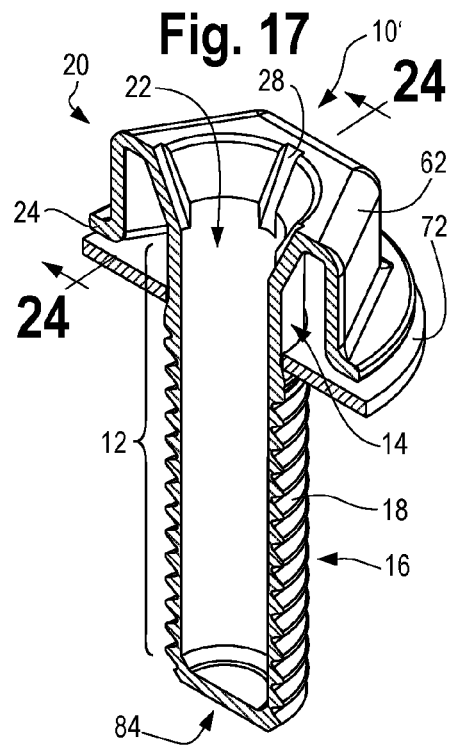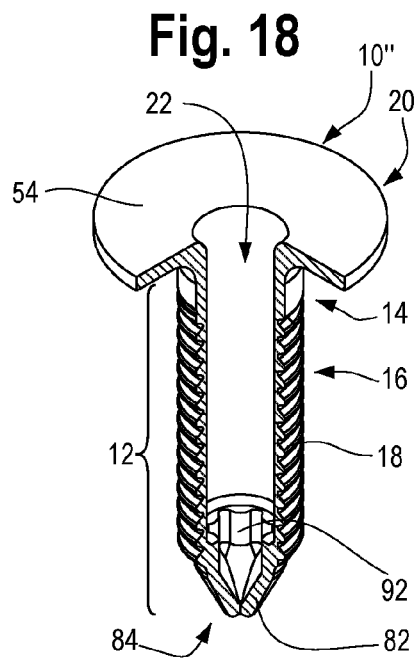

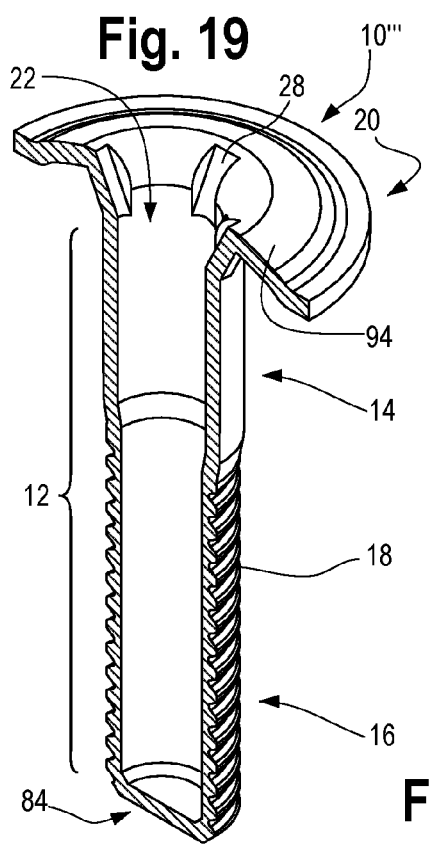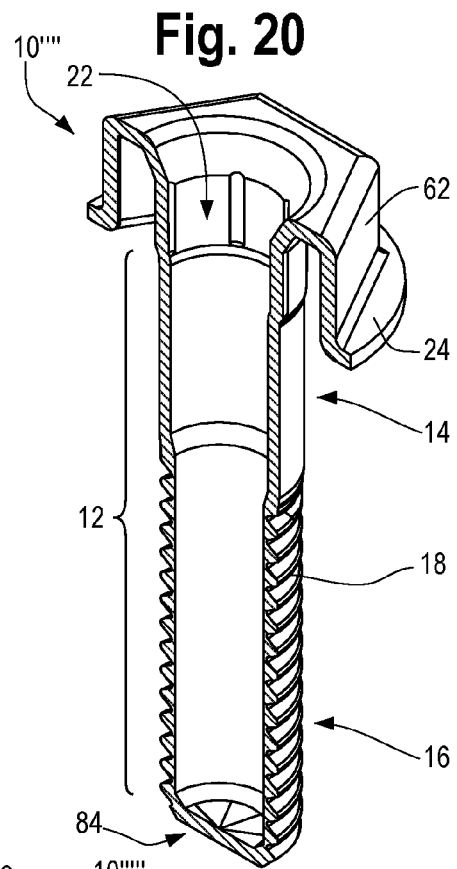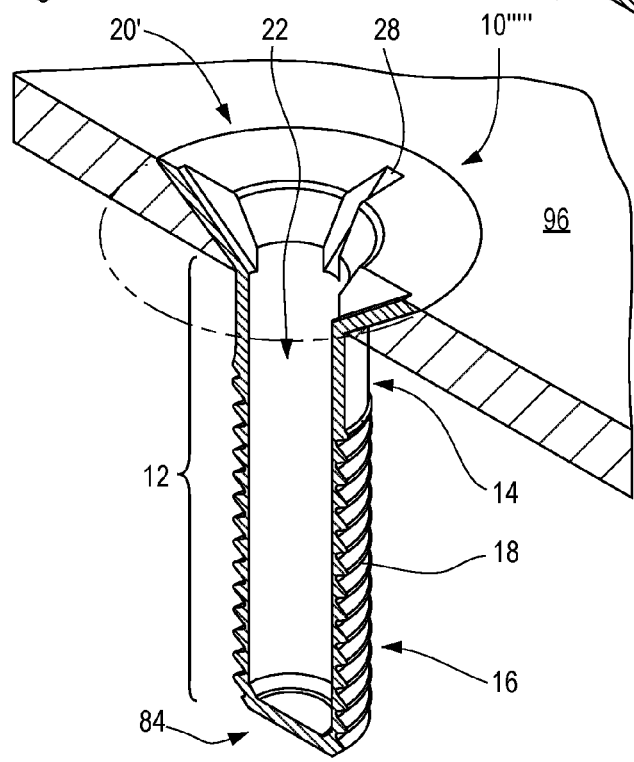

HOLLOW METAL SCREW AND METHOD OF MAKING

BACKGROUND OF THE INVENTION

The present invention relates generally to a lightweight hollow metal stainless steel screw design particularly for use in aerospace applications, and a related method of making the hollow metal screw. The hollow metal screw is produced by stamping from a generally circular sheet metal disk in one or more steps to form a hollow tubular head and screw shank having a wall of thickness of from 0.2 to 0.7 millimeters. The screw shank is thereafter annealed to soften the screw shank for thread rolling, after which the hollow metal screw is hardened sufficiently to meet aerospace thread strength requirements in a screw which is lighter than a similar size solid screw and therefore contributes to aircraft fuel economy.

Screws are generally known in the art, and tend to comprise a solid core shank upon which is rolled to form a set of screw threads of prescribed pitch and length. In general terms, a high strength corrosion resistant steel (CRES) material is preferred as the screw material since threads of hardened CRES can be repeatedly re-installed into a threaded bore receptacle without thread damage. Although, CRES constitutes a relatively heavy metal material and thus does not contribute to aircraft fuel economy, especially when the typical aircraft includes several thousand such screws. Attempts to use lighter weight metals, such as a solid core aluminum or titanium screw, have met with limitations in the ability for a mechanic to repeatedly install and remove the same screw without damaging the threads due to thread galling.

In the past, threaded screws have comprised solid cores, or a hollow screw backstopped by a core insert of plastic or the like. Unfortunately, the plastic core insert is not without at least some weight addition, whereby the screw still is limited in its contribution to aircraft fuel economy.

The present invention comprises an improved hollow corrosion resistant metal screw wherein the screw is stamped from a generally circular disk of a selected corrosion resistant metal material to provide a shank wall thickness of 0.2 to 0.7 millimeters, followed by annealing to soften the metal material, followed in turn by thread rolling and then by hardening steps to provide a hollow metal screw with a thread strength sufficient to withstand most aerospace applications, and to contribute to aircraft fuel economy by providing a hollow screw with corrosion resistant metal threads wherein the hollow screw is approximately 50% the weight of a solid core screw made from the same material. The present invention fulfills these needs and provides further advantages.

SUMMARY OF THE INVENTION

One embodiment of the hollow screw as disclosed herein includes a head and an elongated and hollow shaft integrally extending therefrom and formed from a flat stock of metal material. The elongated and hollow shaft includes a shank portion and a threaded portion having a plurality of threads thereon. A rotational drive mechanism may be integrally formed from the flat stock of metal material and coupled with the head or the elongated and hollow shaft, and configured to facilitate tightening of the hollow screw by way of the threads. In one embodiment, the rotational drive mechanism is a polygonal shape formed from the flat stock of metal material, wherein the polygonal shape may include an outer polygonal shape (e.g., a hexagon). Alternatively, the rotational drive mechanism may include an inner recess (e.g., a spline or cruciform recess) formed from the head. Such a recess could be formed into a flat head or a rounded head.

In another aspect of this embodiment, an integral washer may be formed from the flat stock of metal material and extend outwardly from the head. A captive washer may at least partially form around the integral washer in a manner permitting free rotation of the captive washer relative to the integral washer, the head, and the elongated and hollow shaft. More specifically, an outer rim of the captive washer may be turned upwardly and around an outer periphery of the integral washer to adjacently attach the captive washer about the integral washer, for sandwiching the integral washer therein. In one embodiment, the captive washer may include a conductive material and have a thickness of about 0.15 to 0.30 millimeters.

In other aspects of this embodiment, the hollow screw may include an elongated and hollow body having a constant diameter. In this embodiment, the threads include an outer diameter relatively larger than the outer diameter of the relatively smooth shank portion. Here, a free floating washer may be slidable along the shank portion and captive between the integral washer and the threaded portion, when added before rolling the threads. Alternatively, the elongated and hollow body may be formed from a shank portion having a first diameter relatively larger than a redraw portion having a second relatively smaller diameter, wherein the threads are imparted to the redraw portion during the rolling step.

In one embodiment, the resultant hollow screw may be made from a flat stock of metal material that includes a corrosion resistant metal material, such as A286 steel, wherein the elongated and hollow shaft includes a wall thickness between about 0.2 to about 0.7 millimeters, yet the threads have a strength of about 1200 MPa to 1400 MPa and the weight of the hollow screw is approximately ½ the weight of a solid screw of similar size and shape. Furthermore, a nose may be formed at one end of the elongated and hollow shaft opposite the head. In another aspect, the elongated and hollow shaft may also include a cap on one end opposite the head, the cap configured to prevent fluid flow through the body of the hollow screw.

In another embodiment, the hollow screw as disclosed herein may include a head formed from a flat stock of metal material and an elongated and hollow shaft formed from the flat stock of metal material and integrally extending from the head. In one embodiment, the elongated and hollow shaft may include a shank portion and a threaded portion having a plurality of threads thereon. Preferably, the threads have a strength of about 1200 MPa to 1400 MPa. The threaded portion may be relatively longer than the shank portion, and the threads may have a major diameter relatively larger than the diameter of the shank portion. Additionally, an integral washer may also be formed from the flat stock of metal material and have an enlarged horizontal surface area radially extending outwardly from the head. A captive washer may be positioned underneath the enlarged horizontal surface area and (optionally) have an outer rim bent generally about an outer periphery of the integral washer at least partially sandwiching the integral washer therein. In another aspect of this embodiment, a wave washer may be sandwiched by the captive washer and the enlarged horizontal surface area of the integral washer. In either embodiment, the captive washer may rotate freely relative to the integral washer. To this end, a rotational drive mechanism integrally formed from the flat stock of metal material and coupled with the head or the elongated and hollow shaft may be configured to facilitate tightening of the hollow screw by way of the threads, and about the captive washer.

In one embodiment, the shank portion and the threaded portion of the elongated and hollow shaft have a wall thickness between about 0.2 to about 0.7 millimeters and the captive washer is made from a conductive material having a thickness of about 0.15 to 0.30 millimeters. In another embodiment, the rotational drive mechanism may include an outer polygonal shape or an inner recess formed into the head from the flat stock of metal material, wherein the outer polygonal shape is a hexagon and the inner recess is a spline recess. Alternatively, the rotational drive mechanism may include an inner recess stamped into the bottom of the elongated and hollow shaft, and from the flat stock of metal material. In this embodiment, a nose may be formed at this end, especially when the head is a round head or a flat head. Here, the elongated and hollow shaft is capped to prevent flow through the body of the hollow screw. Preferably, the flat stock of metal material is a corrosion resistant metal material, such as A286 steel.

In another embodiment, the hollow screw as disclosed herein may include a head formed from a corrosion resistant flat stock metal material such as A286 steel. An elongated and hollow shaft having a wall thickness between about 0.2 to about 0.7 millimeters may also be formed from the corrosion resistant flat stock metal material and extend from the head. The elongated and hollow shaft preferably includes a shank portion and a threaded portion having a plurality of threads thereon, wherein the threads have a strength between about 1200 MPa to 1400 MPa. The hollow screw may further include a rotational engagement mechanism such as a polygonal shape or a recess formed from the head or the elongated and hollow shaft, and configured to permit tightening of the hollow screw by way of the threads. Preferably, the rotational engagement mechanism is also formed from the corrosion resistant flat stock metal material and may include a hexagonal head or a spline recess.

In another aspect of this embodiment, the hollow screw may further include an integral washer formed from the head and having an enlarged horizontal and generally circular surface area radially extending outwardly from the head. A captive washer is then positioned adjacent the enlarged horizontal surface area with an outer rim being bent generally about an outer periphery of the integral washer to at least partially sandwich the integral washer therein. The captive washer is able to rotate freely relative to the integral washer and the screw body. In one embodiment, the captive washer may have a thickness of 0.15 to 0.30 millimeters and be made from a conductive material. Furthermore, the elongated and hollow shaft may include a capped and tapered nose having a spline recess therein and be positioned at an end opposite the head. In this aspect, the head preferably includes a round head, a flat head, or a tapered head, as opposed to a polygonal head, like the aforementioned hexagonal head.

One method for making the hollow screw as disclosed herein includes steps for forming a shallow cup having a radially outwardly extending rough cut flange at one end thereof from a generally flat metal material, such as a relatively circular blank stamped from a flat roll stock of corrosion resistant material, such as A286 steel. An elongated and hollow body having a wall thickness of about 0.2 to about 0.7 millimeters may be extruded from the shallow cup. Then, as part of a clipping and flattening step, the generally radially outwardly extending rough cut flange may be trimmed and flattened to the desired size and shape of a screw head (e.g., a flat head or a round head). Next, the hollow screw may be annealed by heating the hollow screw for about 1 hour at an elevated temperature of about 950-980 degrees Celsius to soften at least the elongated and hollow body to a hardness of about 79 Rockwell B. Thereafter, a plurality of threads may be rolled to at least a portion of the exterior of the softened elongated and hollow body, thereby forming the elongated and hollow body into a substantially smooth shank portion and a threaded portion, before finally hardening the hollow screw by precipitation hardening for about 16 hours at a temperature of about 690-720 degrees Celsius in one finishing step. In one embodiment, the hollow screw may have a final hardness of about 42 Rockwell C and the threads may have a strength of about 1200-1400 MPa, and is about ½ the weight of a solid core screw of sufficient thread strength.

Additionally, this method may include redrawing the elongated and hollow body into a shank portion and a redraw portion having an outer diameter relatively narrower than an outer diameter of the shank portion. Furthermore, the screw head may be inverted into a generally central curved dome with an outwardly extending skirt, and then reconed into an outer polygonal shape, and the skirt stamped into an integral washer. Additionally, a free formed washer may be formed into a captive washer over the integral washer. A spline or cruciform recess may further be stamped into the screw head as a rotational drive mechanism. During the rolling step, a stability pin may be inserted into the elongated and hollow body. The stability pin preferably includes an outer diameter approximately the size of an inside diameter of the threaded portion of the elongated and hollow body. Accordingly, the stability pin provides support for the interior peripheral wall to prevent inward collapsing during the rolling step. In other aspects of this method, a rounded nose may be formed from one end of the elongated and hollow body and a bottom formed recess may be stamped into a closed end of the elongated and hollow body.

In another embodiment for a method of making the hollow screw as disclosed herein, such method steps may include forming an elongated and hollow body having a wall thickness of about 0.2 to about 0.7 millimeters from a generally flat metal material. Then, one end of the elongated and hollow body is clipped and flattened into a desired size and shape of a screw head. The hollow screw is then annealed for about 1 hour at an elevated temperature of about 950-980 degrees Celsius to soften the elongated and hollow body and the screw head. Next, a plurality of threads are rolled on to at least a portion of the exterior of the softened elongated and hollow body, and the hollow screw is finally hardened to a hardness of about 42 Rockwell C, wherein the threads have a strength of about 1200-1400 MPa.

This method may further include the steps of stamping a relatively circular blank from a flat roll stock of corrosion resistant material, such as A286 steel, redrawing the elongated and hollow body into a shank portion and a redraw portion having an outer diameter relatively narrower than an outer diameter of the shank portion, inserting a stability pin into the elongated and hollow body and then rolling the threads onto the exterior or outer surface of the elongated and hollow body. As mentioned above, the stability pin may have an outer diameter approximately the size of an inside diameter of the threaded portion of the elongated and hollow body, so the stability pin can support the peripheral wall thereof to prevent collapsing when rolling the threads.

In other aspects of this method, the screw head may be inverted into a generally central curved dome with an outwardly extending skirt. Next, the generally central curved dome may be reconed into an outer polygonal shape (e.g., a hexagon). Thereafter, the skirt may be stamped into an integral washer wherein a free formed washer inserted over the elongated and hollow body may have an outer rim bent over an outer periphery of the integral washer to at least partially sandwich the integral washer therein. Furthermore, a rotational drive mechanism may be imparted to the hollow screw, such as by way of stamping a spline recess or a cruciform recess to the screw head or keying a bottom formed recess into the nose. In another aspect of this method, a rounded nose may be formed from one end of the elongated and hollow body.

Another method for making the hollow screw may include forming a shallow cup from a generally circular flat metal material and having a radially outwardly extending rough cut flange at one end thereof, extruding an elongated and hollow body from the shallow cup, clipping and flattening the generally radially outwardly extending rough cut flange to the desired size and shape of a screw head, inverting the screw head into a central curved dome with an outwardly extending skirt, reconing the central curved dome into a polygonal shape, stamping the skirt into an integral washer, annealing to soften at least the elongated and hollow body, inserting a stability pin into the elongated and hollow body, the stability pin having an outer diameter approximately the size of an inside diameter of the elongated and hollow body to support the peripheral wall therein, rolling a plurality of threads to at least a portion of the exterior of the softened elongated and hollow body after the inserting step, stamping a spline recess to the screw head, and hardening the hollow screw.

Additionally, this method may include redrawing the elongated and hollow body into a shank portion and a redraw portion having an outer diameter relatively narrower than an outer diameter of the shank portion, stamping a relatively circular blank from a flat roll stock of corrosion resistant material comprising A286 steel, wherein the elongated and hollow body comprises a wall thickness of about 0.2 to about 0.7 millimeters. Furthermore, the hollow screw may be heated for about 1 hour at an elevated temperature of about 950-980 degrees Celsius, and precipitation hardened for about 16 hours at a temperature of about 690-720 degrees Celsius, wherein the hollow screw comprises a hardness of about 42 Rockwell C and the threads comprise a strength of about 1200-1400 MPa after the precipitation hardening step. Moreover, a washer may be inserted over the elongated and hollow body before the rolling step, which allows the washer to free float between the integral washer and the threads. Also, a rounded nose may be formed from one end of the elongated and hollow body and keyed with a bottom mounted recess as a rotational drive mechanism.

In another aspect of the embodiments disclosed herein, a hollow nut may include a body having an internally threaded core and a first end having a radially outwardly extending flange. A captive washer having an inner aperture with a diameter larger than the internally threaded core to permit insertion of a threaded fastener is at least partially formed around the radially outwardly extending flange generally in adjacent relationship with the first end and permitting free rotation relative to the nut when attached thereto. In this embodiment, a wave washer may also be sandwiched between the captive washer and the first end having the radially outwardly extending flange. Preferably, the body is formed from a flat stock of metal material.

Another embodiment of the hollow nut includes a body having an internally threaded core with at least one end having a radially extending flange, a wave washer positioned substantially adjacent the at least one end, and a captive washer at least partially formed around the radially outwardly extending flange and generally sandwiching the wave washer in between, wherein the captive washer is freely rotatable relative to the wave washer and the radially extending flange.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 16 is a partial cut-away perspective view of the hollow screw of FIG. 1;

FIG. 17 is a partial cut-away perspective view of an alternative hollow screw having a shorter elongated body relative to FIG. 16, a larger threaded portion relative to the smooth shank portion, and a free formed washer thereon;

FIG. 18 is a partial cut-away perspective view of an alternative hollow screw having a flat head, rounded nose and internal bottom formed recess stamped therein;

FIG. 19 is a partial cut-away perspective view of an alternative hollow screw similar to FIGS. 16 and 17, illustrating a substantially rounded head in place of the hexagonal head;

FIG. 20 is a partial cut-away perspective view of another alternative embodiment of the hollow screw and similar to FIGS. 1, 16 and 17, illustrating a standalone integral washer;

FIG. 21 is a partial cut-away perspective view of another embodiment of a hollow screw in accordance with the embodiments disclosed herein, including a flat head mounted flush with a surface;

DETAILED DESCRIPTION OF THE PREFERRED EMBODIMENTS

Figure 1:
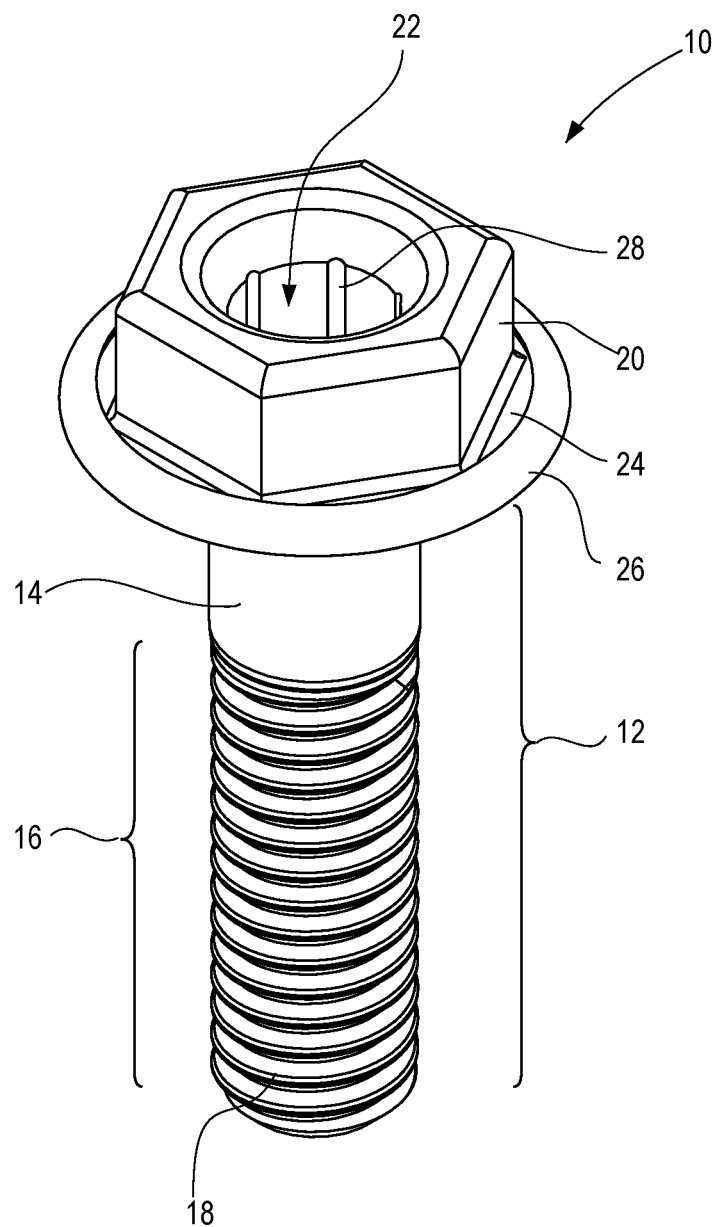
FIG. 1 is a perspective view of one embodiment of the hollow screw as disclosed herein.

As shown in the exemplary drawings, one embodiment of a hollow screw in accordance with the present disclosure is referred to generally in FIG. 1 by the reference numeral 10. As shown in FIG. 1, this embodiment of the hollow screw 10 includes an elongated body 12 (e.g., made from a corrosion resistant metal or steel material), having a smooth shank portion 14 and a threaded portion 16, having a plurality of threads 18 thereon, a head 20, and a generally hollow interior identified as a hollow shaft 22 therein, which may be capped at one end to prevent fluid flow through the hollow shaft 22. In this embodiment, the hollow screw 10 further includes an integral washer 24 preferably generally formed from a portion of the head 20 and a captive washer 26 that may optionally be added to the hollow screw 10, during a stamping step, as described in more detail below. The captive washer 26 may rotate freely relative to the integral washer 24 to prevent the head 20 of the hollow screw 10, and specifically the integral washer 24, from digging into the outer mounting surface where the hollow screw 10 may be inserted and used, as in the case of aerospace applications. In this embodiment, the head 20 is in the shape of a hex nut and may be used alone or in combination with an inner recess 28, such as a spline or cruciform recess or indentation, for purposes of rotationally tightening the hollow screw 10, in accordance with known tools and the embodiments disclosed herein.

Figure 2:
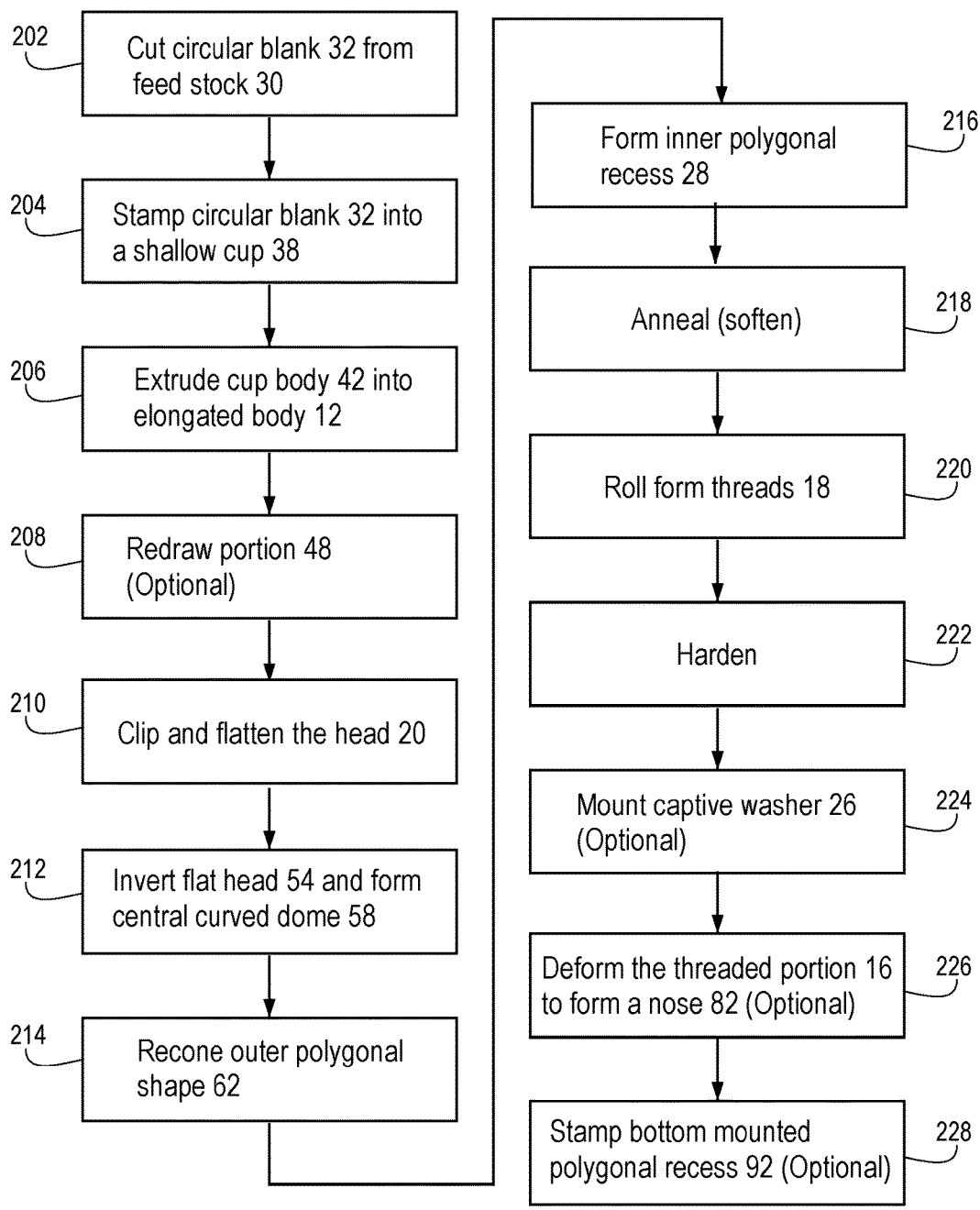
FIG. 2 is a flow chart illustrating a series of process steps for manufacturing the hollow screw, such as those shown in FIGS. 1, 16-21 and 25.
Figure 3:
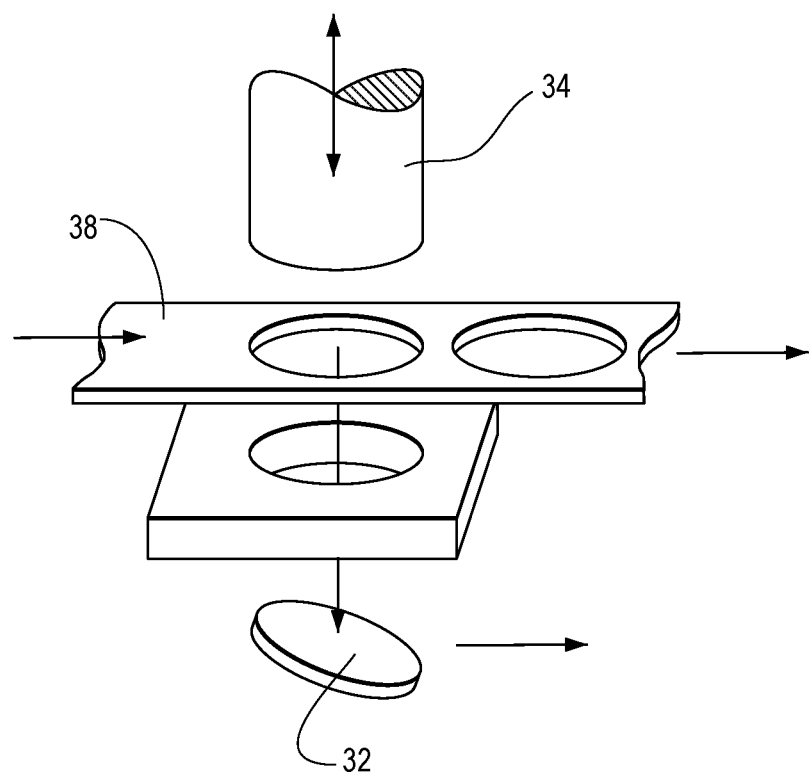
FIG. 3 is a fragmented perspective view illustrating an initial cutting step wherein a generally circular and flat blank is cut from a flat stock of metal material.
Figure 4:
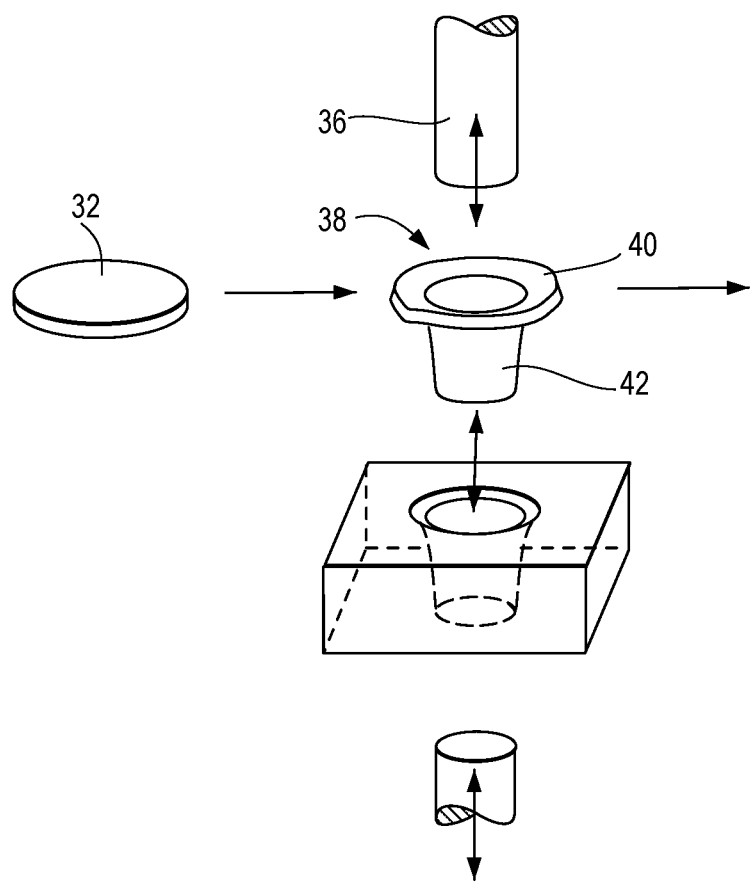
FIG. 4 is a fragmented perspective view wherein the circular blank is stamped into the shape of a shallow cup having an generally rough cut flange and an extruded cup body.
Figure 5:
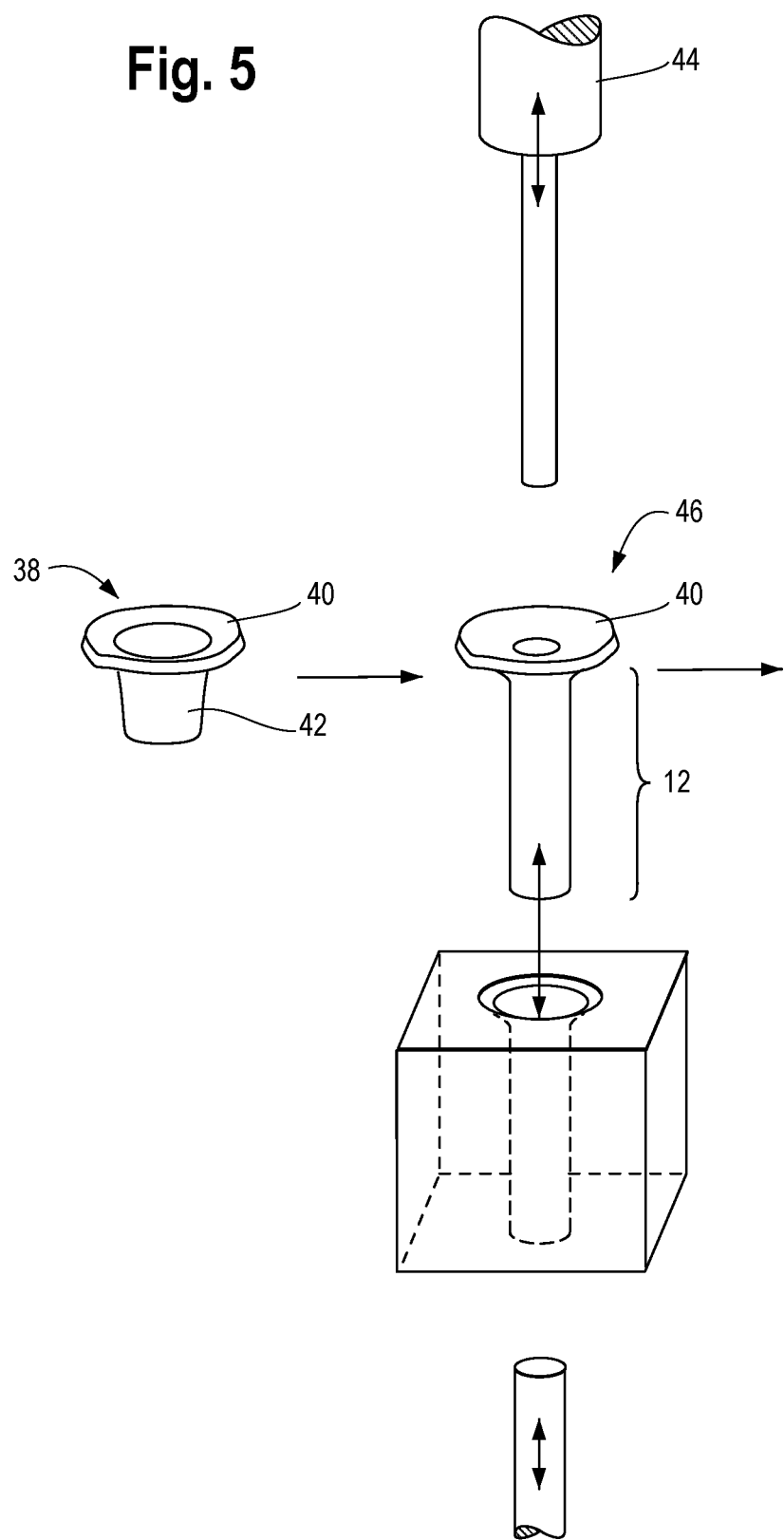
FIG. 5 is a fragmented perspective view illustrating an extrusion step forming an elongated hollow body having a wall thickness on the order of about 0.2 to 0.7 millimeters.

The thus resultant hollow screw 10 may include a lightweight construction which is easy to install, remove, and re-install, and which contributes significantly to overall fuel economy of the aircraft. Moreover, the threaded portion 16 and specifically the threads 18 are preferably capable of meeting most aerospace strength requirements in an acceptable fashion. To this end, the hollow screw 10, and the related method steps for making the screw 10, and its variations shown, e.g., in FIGS. 16-25, are generally shown in the flowchart of FIG. 2, and more specifically with respect to FIGS. 3-15. The hollow screw 10 provides substantial thread strength to resist galling on removal or on reinstallation, and which is about ½ the weight of a solid screw.

With respect to the manufacturing process, FIG. 2 is a flow chart illustrating the general process (200) for forming one or more variations of the hollow screw 10, as disclosed herein. For example, in a first step (202), a flat strip of stainless steel feed stock 30, such as A286 corrosion resistant steel or the like, may initially be fed into a punch press or the like (shown generally in FIG. 3) to cut a plurality of circular blanks 32 with a punch 34. Each circular blank 32 is then stamped as part of step (204) using one or more formations that may use one or more stamping tools 36, of the type generally shown in FIG. 4, into a shallow cup 38 of selected size and shape. The shallow cup 38 illustrated in FIG. 4 includes a generally radially outwardly extending rough cut upper flange 40 and relatively short extruded cup body 42. The shallow cup 38 is then processed as part of an extrusion step (206) in FIG. 5 wherein the length of the extruded cup body 42 is lengthened in one or more formations into the approximate size and shape of the elongated body 12 of the final hollow screw 10 by an extrusion tool 44. Of course, the extrusion step (206) may use one or more extrusion tools 44 that vary in size and shape depending, of course, on the final size and shape characteristics of the hollow screw 10, and as part of one or more formations, to obtain the desired work piece 46 suitable for the next step (208).

Figure 6:
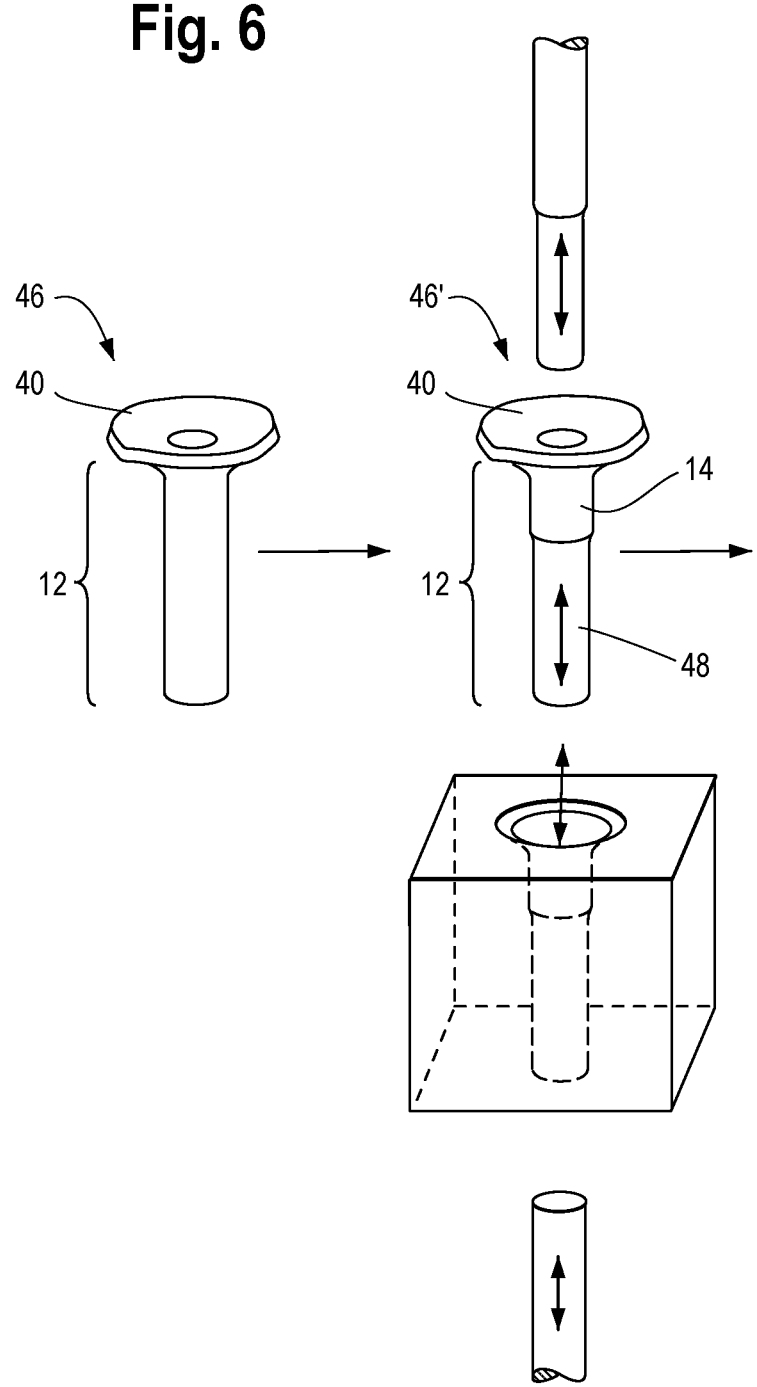
FIG. 6 is a fragmented perspective view illustrating a redraw step forming a reduced diameter or redrawn portion at a lower end of the elongated body.

In this respect, the next redraw step (208) is optional. Step (208), as show in more detail in FIG. 6, includes redrawing a relatively narrow or redrawn portion 48 from the otherwise consistent diameter elongated body 12, as shown in a work piece 46'. Step (208) basically separates the elongated body 12 into two primary portions, the smooth shank portion 14 and the relatively narrower and still smooth redraw portion 48, as shown in FIG. 6. Whether step (208) is performed is dependent on whether the resultant thread portion 16 is to have the threads 18 of the same (FIG. 22) or larger (FIGS. 23 and 24) outer diameter relative to the smooth shank portion 14, as described in more detail below. Although, preferably, the entire elongated body 12 has a wall thickness on the order of about 0.2 to about 0.7 millimeters, even though the outer diameter of the smooth shank portion 14 may be different than the outer diameter of the redraw portion 48 (and eventually the resulting threads 18).

Figure 7:
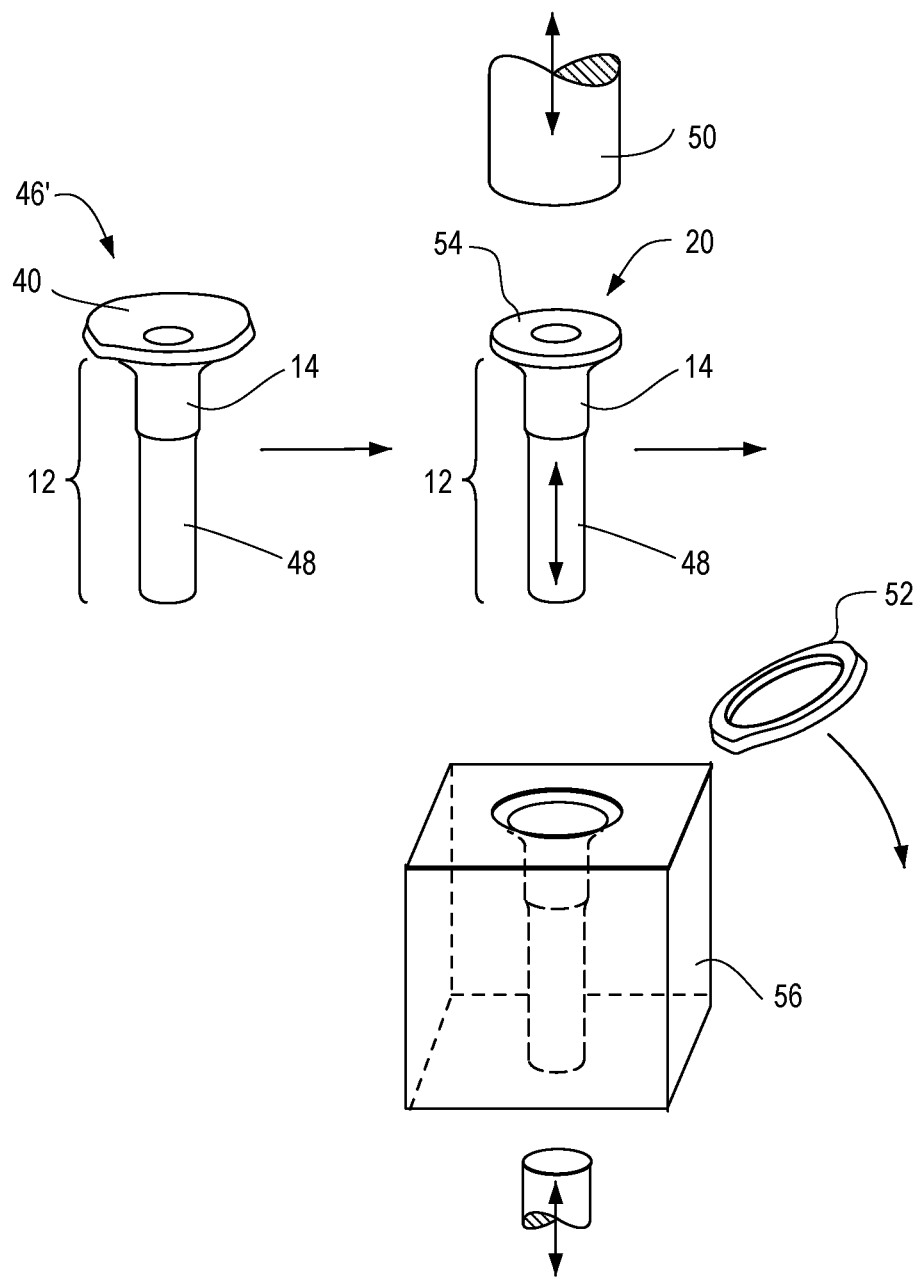
FIG. 7 is a fragmented perspective view illustrating a clipping and flattening step to trim and flatten the head.

The next clipping step (210) is compatible with both variations as described above, i.e., the work piece 46 having the constant diameter elongated shank 12 (not shown in FIG. 7) or the work piece 46' having the elongated shank 12 with the redraw portion 48 (shown in FIG. 7). In general, subsequent steps (212)-(228) are also compatible with both work pieces 46, 46'. The only differences are with respect to the outer diameter of the shank portion 14 relative to the threaded portion 16, and specifically the threads 18, as shown and described in more detail below with respect to FIGS. 22-24. In step (210), the head 20 is illustrated being clipped and flattened. As viewed in FIG. 7, the rough cut flange 40 can be trimmed to an overall desired size and shape and flattened by a single stamping tool 50, or by clipping the work piece 46, 46' in one step with one tool, and stamping the work piece 46, 46' in another step with another tool. Of course, the clipping and stamping step may involve multiple formations. To this end, either way, the rough cut flange 40 is cut away from the head 20 and the head 20 is stamped into a generally flat head 54. FIG. 7 illustrates a roughened outer edge portion 52 cut-away from the head 20 and being discarded therefrom. The flat head 54 may be the same or substantially similar to the flat head 54 shown in the final hollow screw 10" of FIG. 18. The underlying tool blank 56 is shown having a shape and structure to accommodate insertion of the work piece 46' with the elongated body 12 having the shank portion 14 and the relatively narrower redraw portion 48, but the tool blank 56 could be changed out for one that includes a constant diameter to match the size and shape the work piece 46 having the constant diameter elongated body 12, or any other such embodiment with various sizes, shapes and/or diameters.

Figure 8:
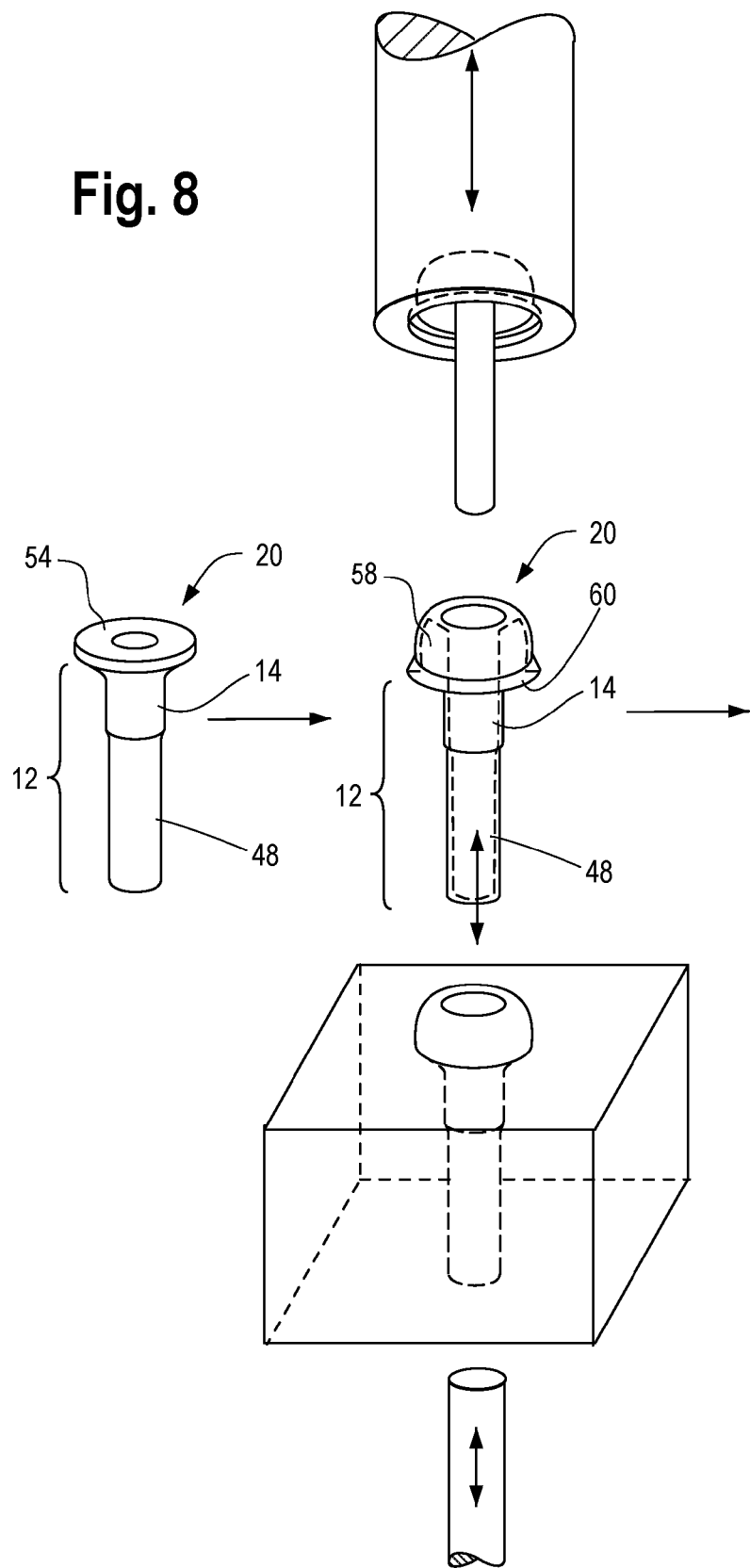
FIG. 8 is a fragmented perspective view illustrating an inversion step forming a domed head with a downwardly projecting unfinished skirt.

The next step (212) as shown in the flowchart of FIG. 2 is to invert the flattened head 54 to form a generally inverted central curved dome 58 as generally shown in FIG. 8. The full size and shape of the curved dome 58 may be accomplished in one or more formations as part of the inversion step (212), depending on the desired shape and size of the curved dome 58. Additionally, FIG. 8 illustrates a generally outwardly extending skirt 60 formed at the bottom of the curved dome 58. The skirt 60 may be formed into the aforementioned integral washer 24, as briefly mentioned above, in subsequent steps or multiple formations as described herein. Similarly, this step (212) may be used with the work pieces 46, 46'.

Figure 9:
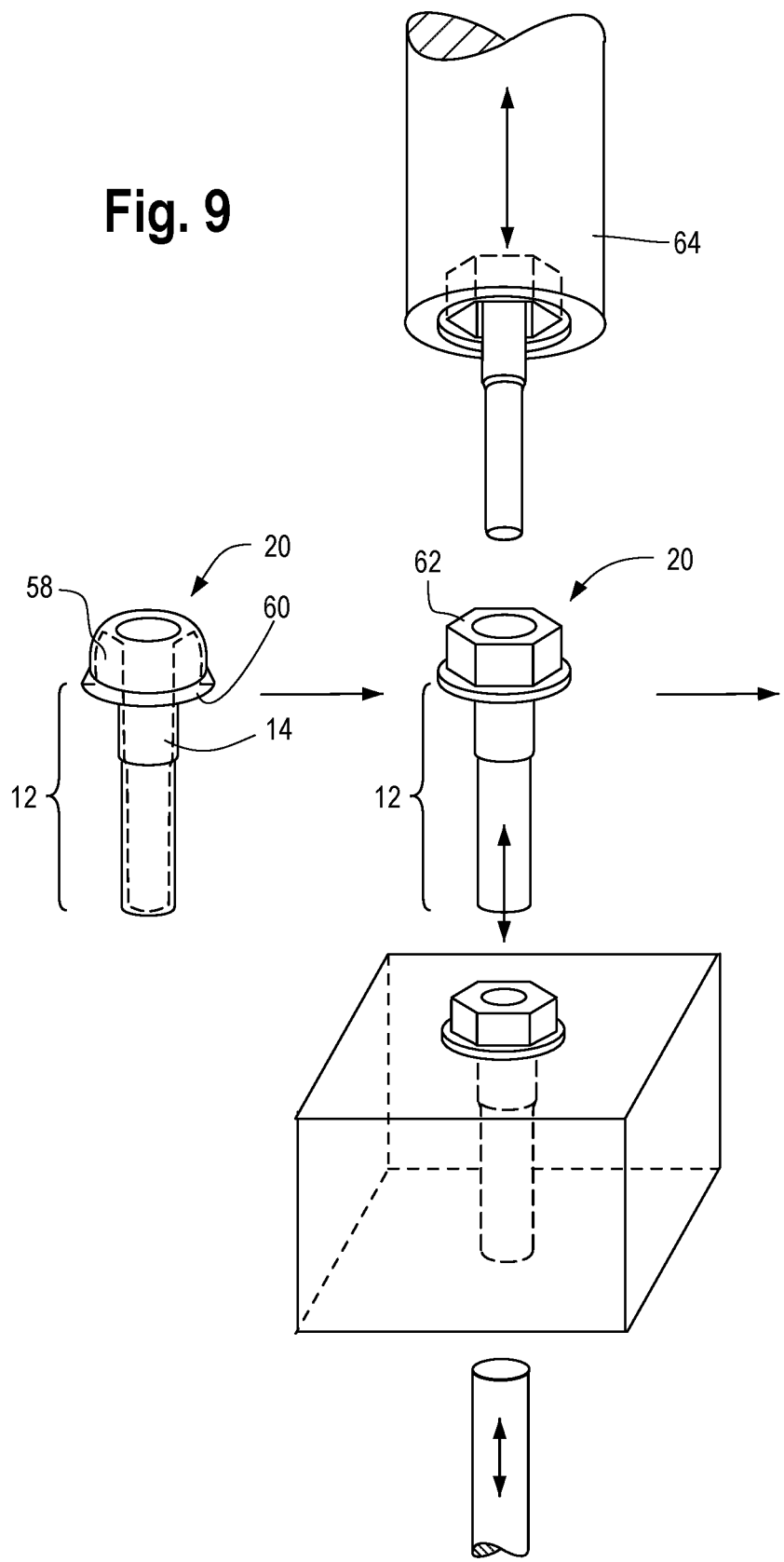
FIG. 9 is a fragmented perspective view illustrating a recone step forming a hexagonal head and integral washer.

The next step (214) is to optionally recone the curved dome 58 into an outer polygonal shape 62, as shown in FIG. 9, with a stamping tool 64 of reciprocal size and shape. Similarly, step (214) may be accomplished in one or more formations, depending on the size, shape and desired application of the finished product. In the embodiment shown in FIG. 9, the curved dome 58 is stamped into a standard polygonal shape 62 of selected size and shape (e.g., hexagonal) for use with a hex wrench or the like. Although, the curved dome 58 may be stamped into other keyed shapes or polygons, as may be known in the art and suitable for turning by a standard key or the like. Of course, the polygonal shape 62 may be any shape or size known in the art to provide keyed rotation of the hollow screw 10. Also as part of step (214), and as part of one or more formations, the outer skirt 60 may be generally formed into the size and shape of the integral washer 24, as shown herein with respect to FIGS. 1, 16, 17 and 20.

Figure 10:
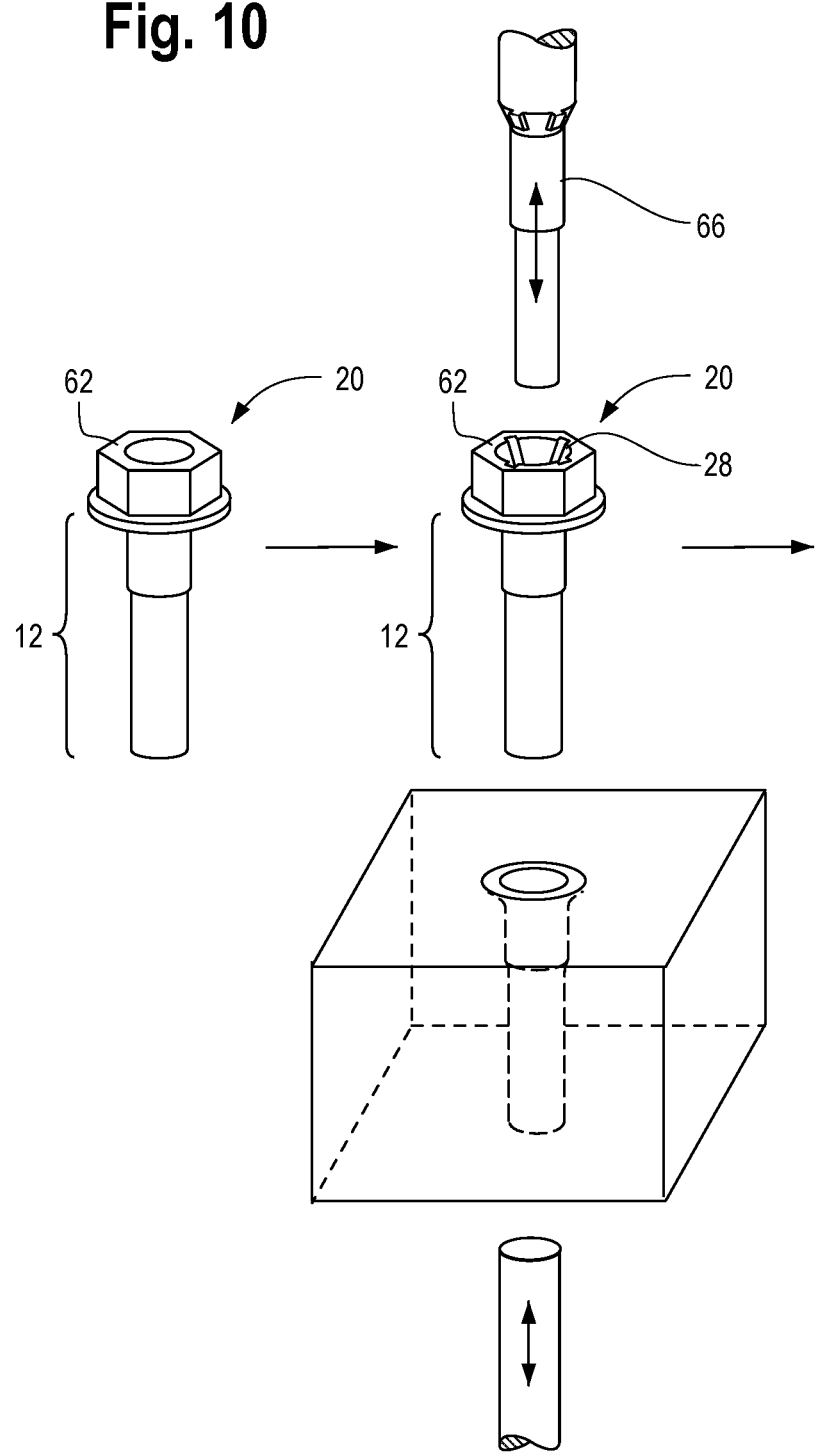
FIG. 10 is a fragmented perspective view similar to FIG. 9, illustrating a stamping step forming an internal drive recess.

In addition to or instead of step (214), the inner recess 28 may be formed as part of step (216). For example, FIG. 10 illustrates the head 20 being stamped by a spline stamp 66 forming the interior surface thereof into the shape of the inner-formed recess 28. In this embodiment, the inner recess 28 is the size and shape of a spline recess suitable for turning by a standard spline key or the like. Of course, the inner recess 28 may be any shape or size known in the art to provide keyed rotation of the hollow screw 10. The hollow screw may include only the outer polygonal shape 62 (e.g., FIG. 25), only the inner recess 28 (e.g., FIGS. 19 and 21), a combination of the outer polygonal shape 62 and the inner recess 28 (e.g., FIGS. 1, 16, 17, and 20), or none of the above (e.g., FIG. 18), as described in more detail below.

In one embodiment, the next step (218) may be to anneal the thus-far formed hollow screw work piece to soften the corrosion resistant steel material for thread rolling. In one embodiment, the annealing step (218) may be performed in a heat treatment for about 1 hour at an elevated temperature of about 950-980 degrees Celsius. The elongated body 12, including only the shank portion 14 in some embodiments or the shank portion 14 and the redraw portion 48 in other embodiments, may include a hardness of about 79 Rockwell B at the end of the annealing step (218).

Figure 11:
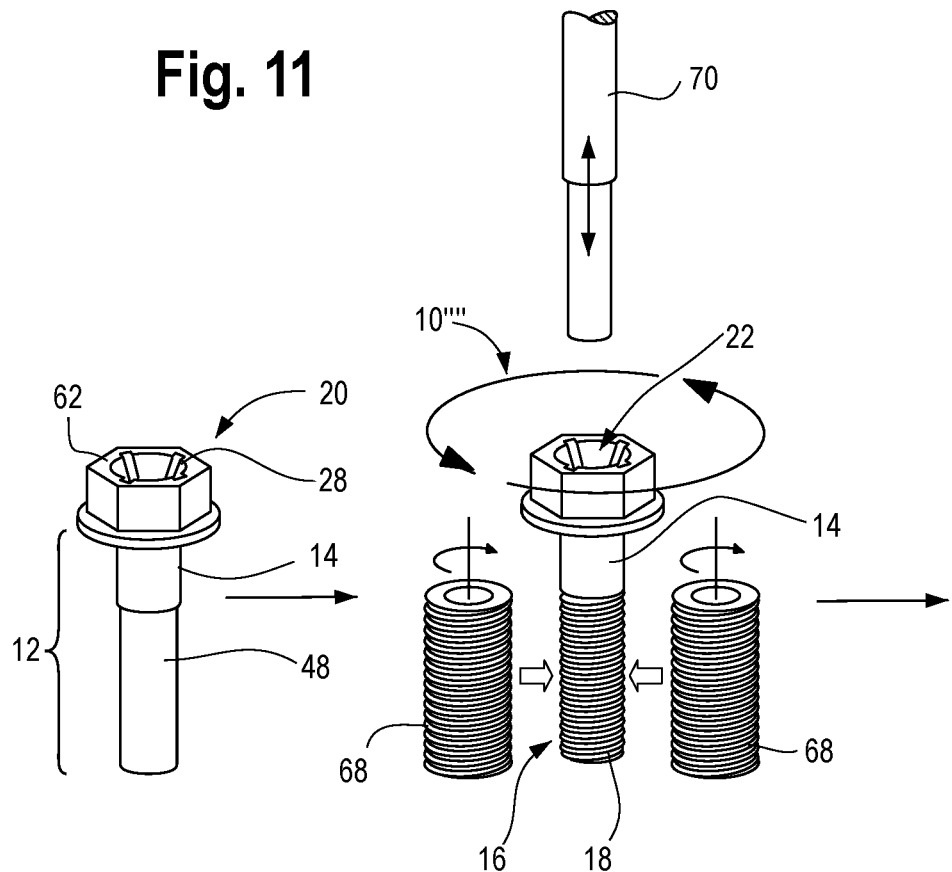
FIG. 11 is a fragmented perspective view illustrating a thread rolling step.

At this point, the threads 18 may be roll formed as part of step (220), as shown in FIG. 11. In one embodiment, as shown in FIG. 11, the threads 18 are roll formed to the redraw portion 48 of the elongated body 12 by way of at least a pair of thread rolling dies 68. Although, step (220) may be performed with any number of rolling dies 68, such as three or more, as needed. Additionally, step (220) may include deployment of a stability pin 70 into the hollow shaft 22 during the rolling step (220) for stabilization therein and to prevent the peripheral wall of the redraw portion 48 from collapsing into the interior of the hollow shaft 22. In this respect, the stability pin 70 preferably has an outside diameter approximately the size as the inside diameter of the hollow shaft 22. Accordingly, the formed threads 18 preferably have the same wall thickness as the shank portion 14, namely, about 0.2 to about 0.7 millimeters.

Following the rolling of the threads 18 in step (220), the entire hollow screw 10"" is precipitation hardened by heat treatment for about 16 hours at an elevated temperature of about 690-720 degrees Celsius during step (222), to provide a hollow screw 10"" having a hardness on the order of about 42. Rockwell C. The strength of the threads 18 is on the order of about 1200 megapascals ("MPa") to about 1400 MPa, and preferably 1300 MPa, suitable for most aerospace applications. As such, FIG. 11 illustrates one embodiment of a finished stainless steel hollow screw 10"" (FIG. 20) ready for use.

Figure 12:
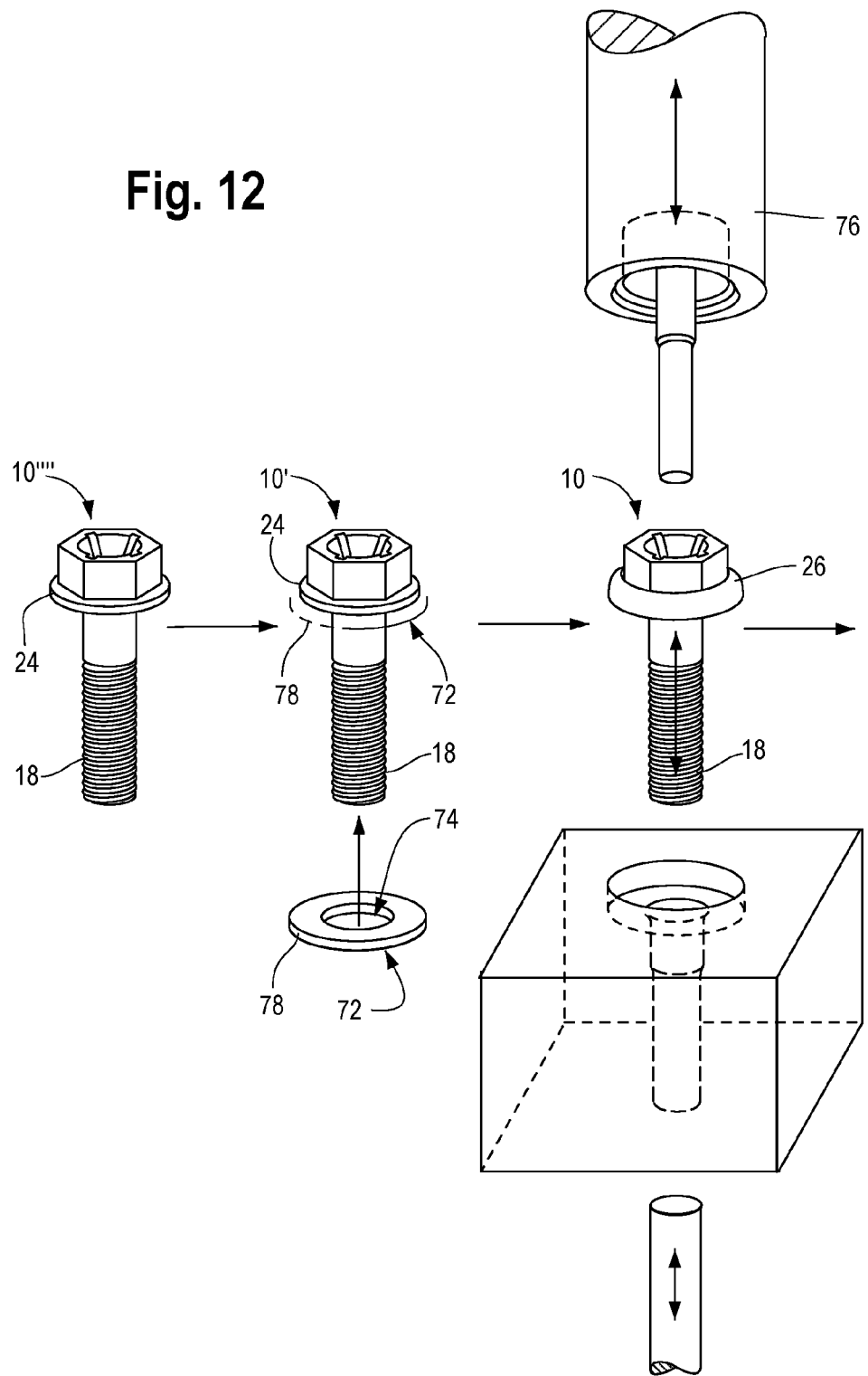
FIG. 12 is a fragmented perspective view illustrating a mounting step, wherein a captive washer is stamped to the integral washer of the hollow screw head.

Although, in another alternative embodiment, the hollow screw 10"" could be fitted with an optional washer, such as the captive washer 26 (FIG. 1), as shown in FIG. 12 with respect to step (224) in FIG. 2. Here, a free formed washer 72 having an aperture 74 with a diameter slightly greater than the outer diameter of the threads 18 is able to slide on to the hollow screw 10"" and along the length of the elongated body 12 to the position shown in phantom in FIG. 12. This configuration is now commensurate in scope with the hollow screw 10' illustrated in FIG. 17, and may be used as described herein. Although, the potential drawback of this embodiment is that the free formed washer 72 may fall off the length of the elongated body 12.

Alternatively, the hollow screw 10' and the free formed washer 72 may be loaded together for press fit engagement by another tool 76, wherein an outer rim 78 of the free formed washer 72 is turned upwardly to fit relatively closely with the integral washer 24. This embodiment is shown with respect to the hollow screw 10 in FIG. 12. Here, the integrally formed head 20 and the elongated body 12 are able to rotate relative to the now mounted captive washer 26. Mounting (224) of the outer rim 78 of the free formed washer 72 over the integral washer 24 of the head 20 may take place in a conventional assembly press (shown generally in FIG. 12) or the like. The optional captive washer 26 may be relatively thin, e.g., on the order of about 0.15 to 0.3 millimeters, and preferably 0.2 millimeters, and is desirably formed from a conductive material, such as a stainless steel or the like. The captive washer 26 is used in those environments wherein it is desired to prevent the turning (torque) forces applied to tensioning the hollow screw 10 from rotating the associated attachment or the like.

Figure 13:
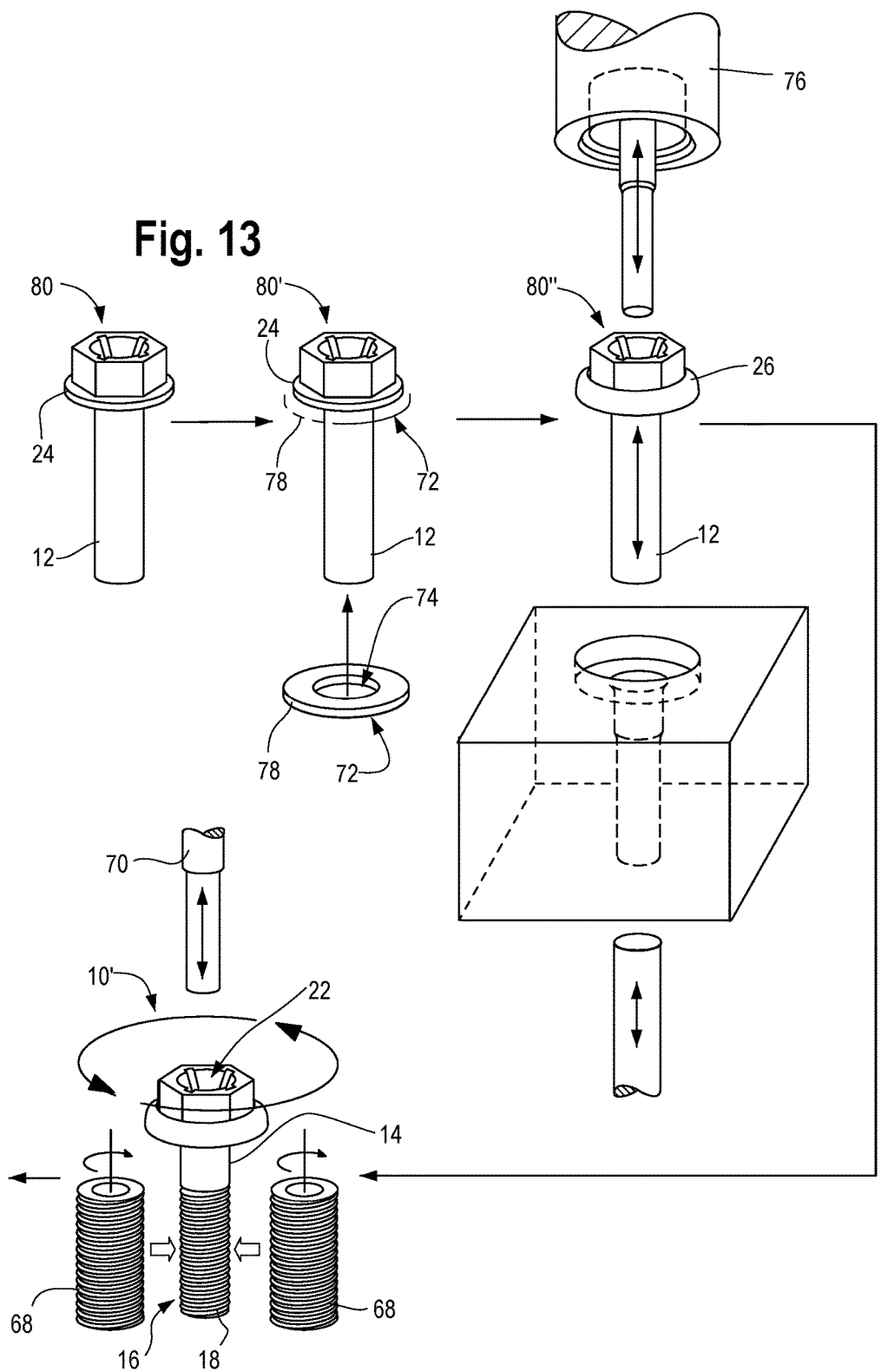
FIG. 13 is a fragmented perspective view similar to FIG. 12, illustrating an alternative mounting step for stamping the captive washer to the integral washer.
Figure 14:
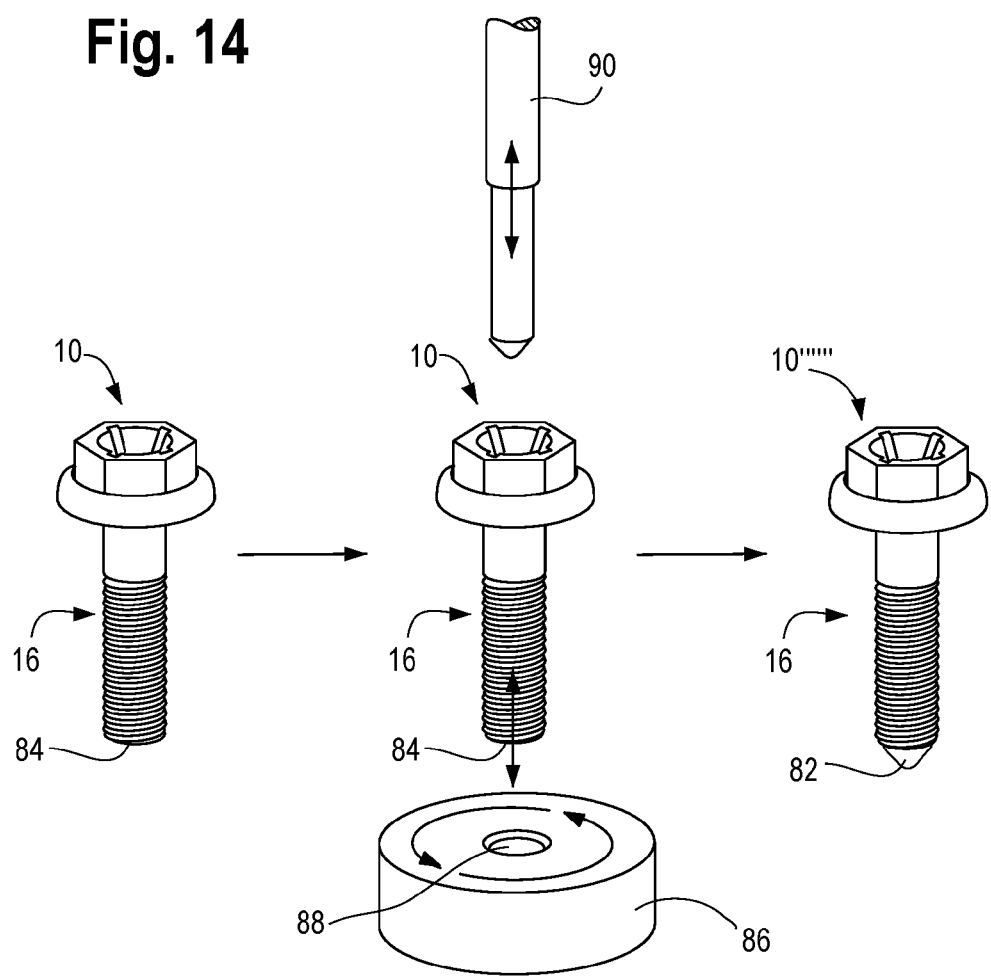
FIG. 14 is a fragmented perspective view illustrating a deformation step to round off one end of the threaded hollow screw into a tapered nose.
Figure 15:
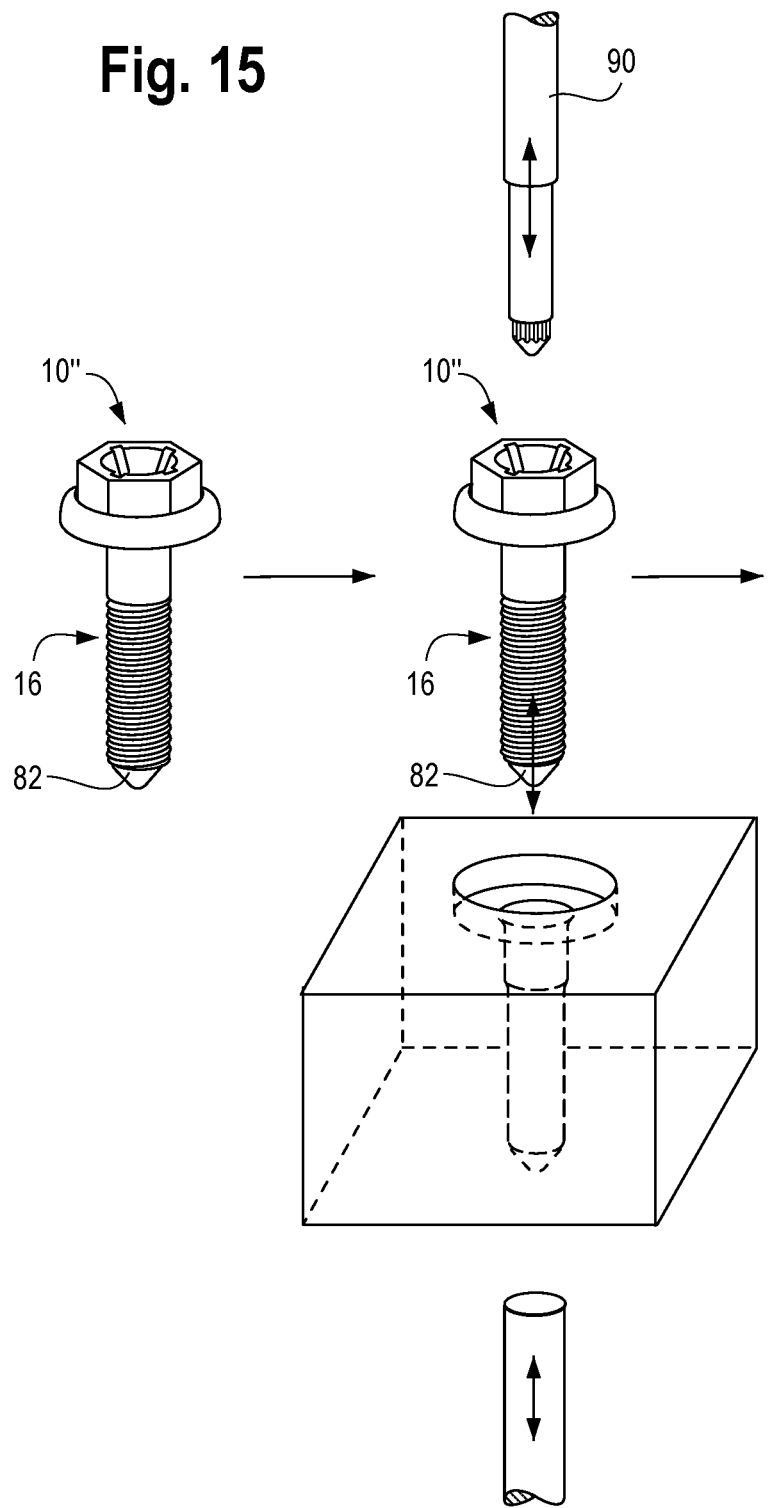
FIG. 15 is a fragmented perspective view illustrating a step for stamping an internal bottom formed recess at the nose.

FIG. 13 is an alternative embodiment to those shown in FIGS. 11 and 12, and with respect to steps (220) and (224). FIG. 13 illustrates a hollow screw work piece 80 formed as a result of the exclusion of the redraw step (208), as mentioned above. In this respect the work piece 80 includes only the constant diameter elongated body 12—the work piece 80 otherwise does not include the relatively narrower redraw portion 48. Here, the free formed washer 72 is able to slide on to the elongated body 12 because the aperture 74 has a diameter slightly greater than the outer diameter of the elongated body 12. The work piece 80' may then go through the same or substantially similar annealing step (218) and rolling step (220), as described above. But, in this embodiment, since the elongated body 12 was of constant diameter, the resulting threaded portion 16 includes a series of threads 18 having an outer diameter greater than the outer diameter of the shank portion 14 and preferably wider than the diameter of the aperture 74 of the free formed washer 72. As such, the larger diameter threads 18 may capture the free formed washer 72 with the integral washer 24 as shown, e.g., in FIG. 17, and in more detail in the cross-sectional view of FIG. 24. Here, because the outer diameter of the threaded portion 16 was enlarged during the rolling step (220) of the threads 18, the free formed washer 72 may free float along the shank portion 14, but remains captive between the integral washer 24 and the threads 18. This feature may prevent the free formed washer 72 from sliding off the elongated body 12 of the hollow screw 10' in the event the washer 72 is not mounted to the integral washer 24 as part of step (224).

Alternatively, step (224) may be performed on the work piece 80' whereby the outer rim 78 of the free formed washer 72 is rolled up and over the integral washer 24 substantially in accordance with step (224), and prior to steps (218)-(222). The work piece 80" then goes through the same or substantially similar annealing step (218) and rolling step (220), as described above. But, as described above, since the elongated body 12 was of constant diameter, the resulting threaded portion 16 includes a series of threads 18 having an outer diameter greater than the outer diameter of the shank portion 14 and preferably wider than the diameter of the aperture 74 of the free formed washer 72. As such, the larger diameter threads 18 may prevent the now captive washer 26 from sliding off the elongated body 12 if the captive washer 26 happens to dislodge from the integral washer 24.

In another aspect of the manufacturing process for making the various hollow screws disclosed herein, FIG. 2 illustrates an additional and optional step of deforming the threaded portion 16 to form a nose 82 thereon (226). This step (226) is more specifically shown in FIG. 14, wherein a bottom 84 of the threaded portion 16 is inserted into a formation tool 86 having a generally tapering deformation aperture 88 therein for generally reducing the diameter of the bottom 84 into the form shown with respect to the hollow screw 10''''', and with respect to the hollow screw 10'' in FIG. 18. In one embodiment, a spline keyed retention tool 90 may be inserted into the hollow shaft 22 to prevent rotation thereof as the deformation aperture 88 generally forms the nose 82, having the generally tapering characteristics shown in FIGS. 14 and 18, at the bottom 84 of the threaded portion 16. Of course, this step (226) could be used to form the nose 82 on other embodiments, such as the hollow screws 10, 10', 10''', 10'''', 10''''' shown respectively in FIGS. 16, 17 and 19-21.

In another aspect of the manufacturing process for making one or more of the hollow screws disclosed herein, FIG. 2 illustrates an additional optional step of stamping a bottom formed recess 92 into, e.g., the nose 82. This stamping process (228) is generally shown with respect to FIG. 15. Accordingly, the bottom formed recess 92 may be used in conjunction with or in place of either the outer polygonal shape 62 or the inner recess 28 formed in the head 20. In this respect, various combinations of the hollow screw may include one or more, or any combination of the outer polygonal shape 62, the inner recess 28 and/or the bottom formed recess 92. Although, it is preferred that any such hollow screw include at least one of the outer polygonal shape 62, the inner recess 28 or the bottom formed recess 92 to permit rotational tightening during installation and release during removal.

FIGS. 16-21 illustrate various exemplary embodiments of the hollow screw as disclosed herein. For instance, FIG. 16 illustrates one embodiment of the hollow screw 10 including the elongated body 12 having the shank portion 14 of approximate equal length as the threaded portion 16, with the flat bottom 84. This hollow screw 10 further includes the outer polygonal shape 62 formed from the head 20 with the inner recess 28 in the form of a spline recess (e.g., for use with a Torx or the like) formed therein. Accordingly, this hollow screw 10 may be screw tightened with one of a hex wrench, a spline wrench, or a combination tool for simultaneous engagement with the polygonal shape 62 and the inner recess 28. The head 20 also includes the integral washer 24 having the captive washer 26 formed thereover.

FIG. 17 illustrates another embodiment of a hollow screw 10', wherein the elongated body 12 is relatively shorter than the hollow screw 10 shown in FIG. 16. In this embodiment, the threaded portion 16 is relatively longer in comparison to the smooth shank portion 14. The free formed washer 72 is captured between the threaded portion 16 by the threads 18 and the integral washer 24, as described above, and shown, e.g., more specifically in the cross-sectional view of FIG. 24. Similar to FIG. 16, this embodiment also includes the outer polygonal shape 62 and the inner recess 28 in the form of a spline recess formed in the head 20, and the bottom 84 is unformed or smooth. Accordingly, this hollow screw 10' may be screw tightened with one of a hex wrench, a spline wrench, or a combination tool for simultaneous engagement with the polygonal shape 62 and the inner recess 28.

FIG. 18 illustrates another alternative embodiment of a hollow screw 10'', wherein the threaded portion 16 is relatively longer than the shank portion 14, similar to the embodiment shown above with respect to FIG. 17. Although, in this embodiment, the head 20 is the generally smooth or flat head 54 and otherwise does not include the outer polygonal shape 62 or the inner recess 28. Instead, the hollow screw 10'' includes the bottom formed recess 92 formed generally into the nose 82. In this embodiment, the hollow screw 10'' may be screw tightened with a spline wrench via engagement with the bottom formed recess 92. Although, of course, the bottom formed recess 92 could be formed at the bottom 84 regardless whether the nose 82 is formed therein pursuant to step (226). Similarly, and alternatively, the nose 82 could be formed at the bottom 84 without the bottom formed recess 92. This embodiment is particularly conducive for flush mounting of the flat head 54 to the surrounding mounting surface (not shown). A cap (also not shown) may be inserted into the hollow shaft 22 to close the interior from the surrounding environment, which may be particularly preferred in applications where the hollow screw 10'' is subject to airflow, such as the outside of an airplane (e.g., along the fuselage, wings, etc.).

FIG. 19 is another alternative embodiment of the hollow screw 10''', wherein the threaded portion 16 and the shank portion 14 of the elongated body 12 are similar in size and structure as described above with respect to FIG. 16. In this embodiment, the head 20 is different from the standpoint that it includes a rounded surface 94, as opposed to the above-described outer polygonal shape 62. This rounded surface 94 may be formed thereon as part of step (214), with a suitable stamping tool 64 of reciprocal size and shape, as opposed to stamping the outer polygonal shape 62 thereon. In this embodiment, the hollow screw 10''' includes the inner recess 28 in the form configured to receive a Phillips head screwdriver.

FIG. 20 illustrates another alternative embodiment of the hollow screw 10'''' similar to FIG. 16, excluding the captive washer 26.

FIG. 21 illustrates yet another variation of the hollow screw 10''''', including the hollow shaft 22 formed by the elongated body 12 having the smooth shank portion 14 and the relatively longer threaded portion 16. In this embodiment, the hollow screw 10''''' includes a tapered head 20' designed to seat flush with an outer mounting surface 96 as shown. Furthermore, the head 20' is shown with the inner recess 28 configured for use with a Phillips screwdriver or the like for screw tight fitting therein.

Of course, each of the features described above, e.g., the length of the elongated body 12, the length and diameter of the shank portion 14 and the threaded portion 16, including the threads 18, the size and shape of the head 20 (e.g., polygonal 62, flat 54, rounded 94, flush 20', etc.), the inclusion (e.g., FIGS. 16, 17 and 20) or exclusion (e.g., FIGS. 18, 19 and 21) of the integral washer 24, the inclusion (e.g., FIG. 16) or exclusion (e.g., FIGS. 17-21) of the captive washer 26, the inclusion (e.g., FIGS. 16, 17, 19 and 20) or exclusion (e.g., FIGS. 18 and 21) of the inner recess 28, the location and placement of the free formed washer 72, formation of the nose 82 (e.g., FIG. 18) or use of the flat bottom 84 (e.g., FIGS. 16, 17 and 19-21), and/or the bottom formed recess 92 (e.g., FIG. 18), may be mixed and matched with each other in various different embodiments. While the present application discloses various examples of these combinations, the scope and content of the present application should not be so limited to only those specific embodiments disclosed herein.

Figure 22:
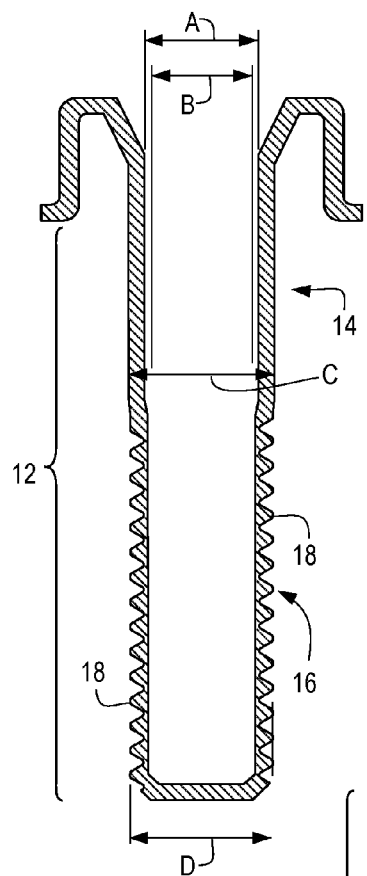
FIG. 22 is a cross-sectional view of one embodiment of the hollow screw having threads formed to the relatively narrower redrawn portion.
Figure 23:
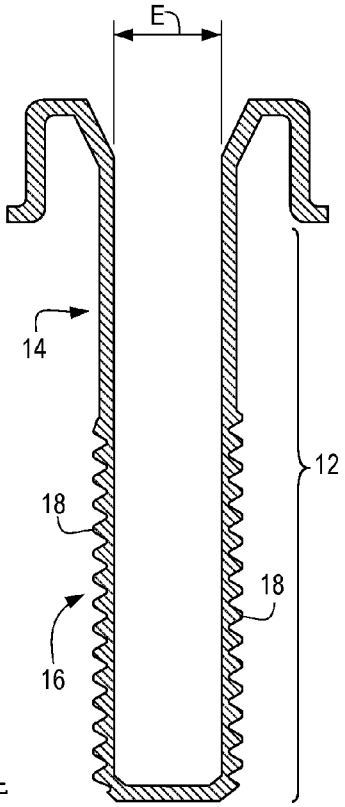
FIG. 23 is a cross-sectional view of another embodiment of the hollow screw having threads formed to the constant diameter elongated body.
Figure 24:
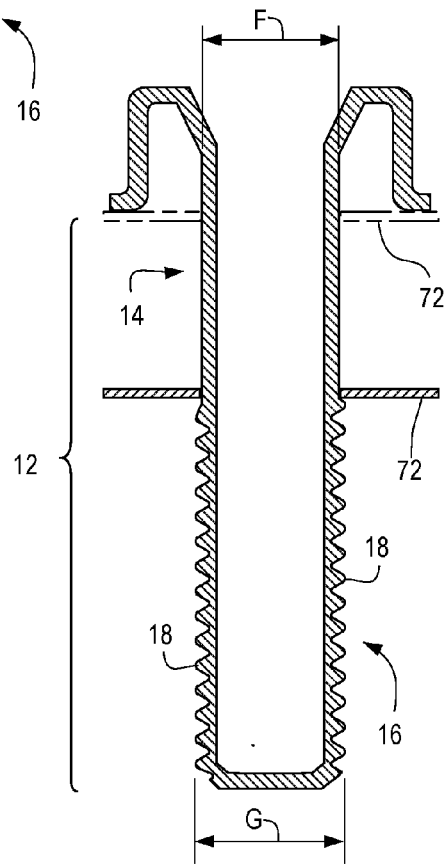
FIG. 24 is another cross-sectional view similar to FIG. 23, illustrating captive placement of the free formed washer between the integral washer and the threads.

FIGS. 22-24 more specifically illustrate the above-mentioned embodiments regarding the different diameter sizes of the shaft portion 14 relative to the threaded portion 16 and the diametric size of the aperture 74 of the free formed washer 72. The embodiment illustrated in FIG. 22 was formed as a result of the redraw step (208). In this respect, the elongated body 12 was further formed into two sections, namely the first shank portion 14 having a first outside diameter relatively larger than the second relatively narrower redrawn portion 48 (FIG. 6). As a result of the formation, the interior diameter "A" of the shank portion 14 is relatively wider than the interior diameter "B" of the then formed redrawn portion 48. When the threads 18 are added as part of the rolling step (220), the outer material of the redrawn portion 48 outwardly deforms approximately ½ the difference between distance "A" and distance "B". Put another way, the outside diameter of the shank portion 14 as measured by distance "C" is approximately the same distance as the outer diameter of the peak-to-peak distance of the threads 18, as measured by distance "D" after completion of the rolling step (220). Thus, the shank portion 14 and the threaded portion 16 have substantially the same outer diameters.

Figure 25:
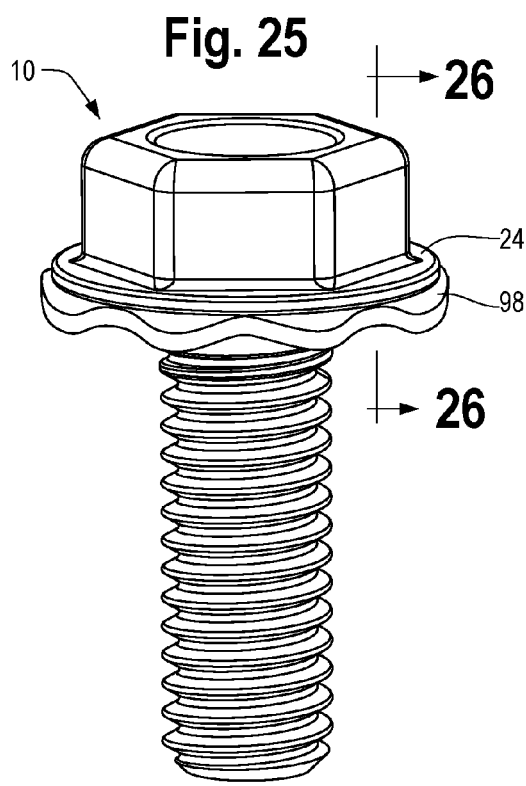
FIG. 25 is a perspective view of the hollow screw of FIG. 1, further including a wave washer.

FIGS. 22 and 23 are somewhat different in that the elongated body 12 was not subject to the redraw step (208) during the forming process. As a result, the elongated body 12, and specifically the hollow shaft 22, has a constant internal diameter, as identified by distance "E". The result is that the thread rolling step (220) again causes the material along the threaded portion 16 to deform outwardly to create the threads 18 therein. This results in the threads 18 extending generally outwardly a distance greater than the outer diameter of the shank portion 14. This is best shown in FIGS. 24 and 25. Additionally, this extended diametrical distance may be used to capture and retain the free formed washer 72 because the diametric distance of the aperture 74, as measured by distance "F" in FIG. 24, is relatively smaller than the outer diameter of the threads 18, as indicated by distance "G" also in FIG. 24. Accordingly, in this embodiment, it is necessary to mount the free formed washer 72 to the elongated body 12 before performing the rolling step (220), as described above. Although, of course, another sized free formed washer could be attached after the rolling step (220) as long as the diameter of the aperture 74 is larger than the outside diameter "G" of the threads 18.

Figure 26:
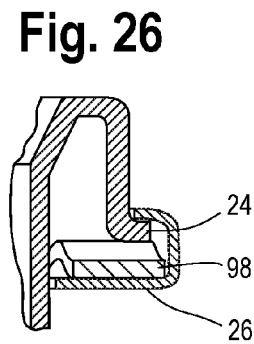
FIG. 26 is a cross-sectional view taken about the line 26-26 in FIG. 25 with the addition of the captive washer, illustrating the sandwiched relationship of the wave washer between the integral washer and the captive washer.

FIG. 25 illustrates another embodiment, wherein the hollow screw 10 includes a wave washer 98. In this embodiment, the wave washer 98 could be crimped or sandwiched in between the integral washer 24 and the captive washer 26. The cross-sectional view of FIG. 26 illustrates the cross-section along line 26-26 in FIG. 25 with the captive washer 26 added to sandwich the wave washer 98 therein with the integral washer 24. The mounting process would be the same or similar to step (224), described above, except with the wave washer 98 sandwiched in between.

Figure 27:
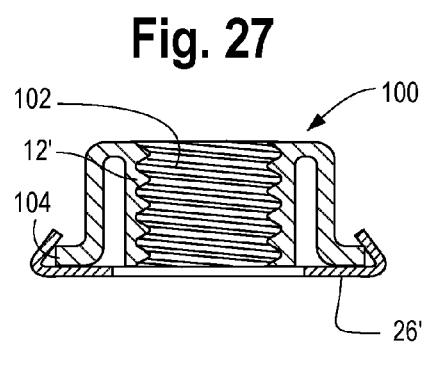
FIG. 27 is an alternative embodiment illustrating the captive washer mounted to a nut.
Figure 28:
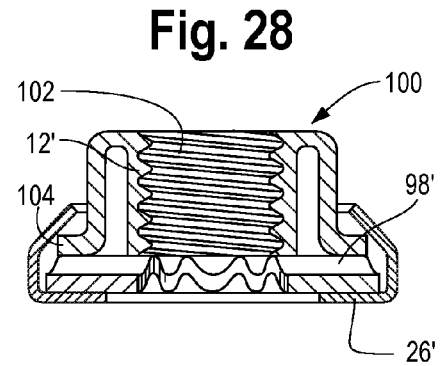
FIG. 28 is an embodiment similar to FIG. 27, illustrating the wave washer sandwiched between the nut and the captive washer.

Similarly, the embodiments disclosed herein could be used to make a hollow nut 100, as shown in FIGS. 27 and 28, from a flat stock of metal material or the like. FIG. 27 illustrates one embodiment wherein the hollow nut 100 includes a comparable body 12' formed as part of one or more formations, as described herein. Obviously, the body 12' is relatively shorter than the above-described elongated body 12 for use as a nut, but the same basic formation procedures apply. Furthermore, the body 12' may include a set of female or internal threads 102 by threading the body 12' using processes known in the art. Similar to the above, the hollow nut 100 also includes the generally outwardly extending radial flange 104 (comparable to the integral washer 24) made as per, e.g., comparable steps (210) and (212), for select mounting of a captive washer 26' in accordance with the embodiments described above (e.g., a comparable step (224)). FIG. 28 is a similar embodiment, but including a wave washer 98' crimped or sandwiched between the outwardly extending radial flange 104 and the captive washer 26', in accordance with a similar or comparable step (224). The nut 100 may also go through a comparable annealing step (218) to soften the nut 100 to form the internal threads 102 and a comparable hardening step (222) to ensure rigidity and longevity.

A variety of further modifications and improvements in and to the hollow screw and the method of making the same will be apparent to persons skilled in the art. By way of example, either one of the inner and outer polygonal shapes can be omitted, or both can be performed in a single stamping step. Alternately, in lieu of the internal drive recess described above, such as a Phillips or Torx recess, other forms of standard drive recesses or polygonal recesses could be formed therein. The annealing and hardening steps can also be varied. Accordingly, no limitation on the invention is intended by way of the foregoing description and accompanying drawings.

What is claimed is:
1. A hollow screw, comprising:
a head formed from a flat stock of metal material;
an elongated and hollow shaft comprising a wall thickness between about 0.2 and 0.7 millimeters formed from the flat stock of metal material and integrally extending from the head, the elongated and hollow shaft including a shank portion and a threaded portion having a plurality of threads thereon; and a rotational drive mechanism comprising a hexagonal shape integrally formed from the flat stock of metal material and an inner spline recess formed from the head or the elongated and hollow shaft, and configured to facilitate tightening of the hollow screw by way of the threads.

2. The hollow screw of claim 1, including an integral washer formed from the flat stock of metal material and extending outwardly from the head.

3. The hollow screw of claim 2, including a captive washer at least partially formed around the integral washer in a manner permitting free rotation of the captive washer relative to the integral washer, the head and the elongated and hollow shaft.

4. The hollow screw of claim 3, wherein an outer rim of the captive washer is turned upwardly and around an outer periphery of the integral washer to adjacently couple the captive washer to the integral washer.

5. The hollow screw of claim 3, wherein the captive washer comprises a thickness of about 0.15 to 0.30 millimeters.

6. The hollow screw of claim 3, wherein the captive washer comprises a conductive material.

7. The hollow screw of claim 2, including a free floating washer slidable along the shank portion and captive between the integral washer and the plurality of threads, the threaded portion having an outer diameter relatively larger than an outer diameter of the shank portion.

8. The hollow screw of claim 1, wherein the flat stock of metal material comprises a corrosion resistant metal material comprising A286 steel.

9. The hollow screw of claim 1, wherein the threads comprise a strength of about 1200 MPa to 1400 MPa.

10. The hollow screw of claim 1, including a nose formed at an end of the elongated and hollow shaft opposite the head.

11. The hollow screw of claim 1, wherein the head comprises a rounded head or a flat head.

12. The hollow screw of claim 1, wherein the elongated and hollow shaft includes a cap preventing fluid flow through an interior of the hollow screw.

13. The hollow screw of claim 1, wherein the weight of the hollow screw is approximately ½ the weight of a solid screw of similar size and shape.

14. A hollow screw, comprising:
a body having a generally inwardly positioned elongated and hollow shaft formed from a flat stock of metal material that turns about itself to form an upwardly presented head and a downwardly extending outer skirt in generally spaced apart relation relative to the inwardly positioned elongated and hollow shaft and terminating in a radially outwardly extending flange, the elongated and hollow shaft including a shank portion and a threaded portion having a plurality of threads thereon;
a captive washer positioned underneath the radially outwardly extending flange and having an outer rim bent generally about an outer periphery of the radially outwardly extending flange at least partially sandwiching the radially outwardly extending flange therein, the captive washer being freely rotatable relative to the radially outwardly extending flange; and a rotational drive mechanism integrally formed from the flat stock of metal material and coupled with the head or at least a portion of the elongated and hollow shaft, and configured to facilitate tightening of the hollow screw by way of the threads.

15. The hollow screw of claim 14, wherein the shank portion and the threaded portion of the elongated and hollow shaft comprise a wall thickness between about 0.2 to about 0.7 millimeters and the captive washer comprises a conductive material having a thickness of about 0.15 to 0.30 millimeters.

16. The hollow screw of claim 14, wherein the rotational drive mechanism comprises an outer polygonal shape formed into the head from the flat stock of metal material.

17. The hollow screw of claim 14, wherein the rotational drive mechanism comprises an inner recess formed from the head.

18. The hollow screw of claim 17, wherein the inner recess comprises a spline recess.

19. The hollow screw of claim 14, wherein the rotational drive mechanism comprises an inner recess stamped into the head from the flat stock of metal material.

20. The hollow screw of claim 14, wherein the flat stock of metal material comprises a corrosion resistant metal material comprising A286 steel.

21. The hollow screw of claim 14, wherein the threads comprise a strength of about 1200 MPa to 1400 MPa.

22. The hollow screw of claim 14, including a nose formed at one end of the elongated and hollow shaft, wherein the head comprises a round head or a flat head.

23. The hollow screw of claim 14, wherein the elongated and hollow shaft includes a cap configured to prevent flow through the hollow screw.

24. The hollow screw of claim 14, wherein the threaded portion is relatively longer than the shank portion, and the threads have a major diameter relatively larger than an outer diameter of the shank portion.

25. The hollow screw of claim 14, including a wave washer sandwiched by the captive washer and the radially outwardly extending flange.

26. A hollow screw, comprising:
a body having a generally inwardly positioned elongated and hollow shaft formed from a flat stock of metal material that turns about itself to form an upwardly presented head comprising a rounded head or a flat head and a downwardly extending outer skirt in generally spaced apart relation relative to the inwardly positioned elongated and hollow shaft and terminating in a radially outwardly extending flange, the elongated and hollow shaft including a shank portion and a threaded portion having a plurality of threads thereon; and
a rotational drive mechanism integrally formed from the flat stock of metal material and coupled with the head or the elongated and hollow shaft, and configured to facilitate tightening of the hollow screw by way of the threads.

27. The hollow screw of claim 26, including a captive washer at least partially formed around the radially outwardly extending flange in a manner permitting free rotation of the captive washer relative to the radially outwardly extending flange, the head and the elongated and hollow shaft.

28. The hollow screw of claim 27, wherein an outer rim of the captive washer is turned upwardly and around an outer periphery of the radially outwardly extending flange to adjacently couple the captive washer to the radially outwardly extending flange.

29. The hollow screw of claim 27, wherein the captive washer comprises a thickness of about 0.15 to 0.30 millimeters.

30. The hollow screw of claim 27, wherein the captive washer comprises a conductive material.

31. The hollow screw of claim 26, including a free floating washer slidable along the shank portion and captive between the radially outwardly extending flange and the plurality of threads, the threaded portion having an outer diameter relatively larger than an outer diameter of the shank portion.

32. The hollow screw of claim 26, wherein the rotational drive mechanism comprises a polygonal shape formed from the flat stock of metal material.

33. The hollow screw of claim 32, wherein the rotational drive mechanism comprises the polygonal shape and an inner recess formed from the head.

34. The hollow screw of claim 33, wherein the polygonal shape comprises a hexagon and the inner recess comprises a spline recess.

35. The hollow screw of claim 26, wherein the flat stock of metal material comprises a corrosion resistant metal material comprising A286 steel.

36. The hollow screw of claim 26, wherein the threads comprise a strength of about 1200 MPa to 1400 MPa.

37. The hollow screw of claim 26, including a nose formed at an end of the elongated and hollow shaft opposite the head.

38. The hollow screw of claim 26, wherein the elongated and hollow shaft includes a cap preventing fluid flow through an interior of the hollow screw.

39. The hollow screw of claim 26, wherein the weight of the hollow screw is approximately ½ the weight of a solid screw of similar size and shape.

40. A hollow screw, comprising:
    a head formed from a flat stock of metal material;
    an elongated and hollow shaft formed from the flat stock of metal material and integrally extending from the head, the elongated and hollow shaft including a shank portion and a threaded portion having a plurality of threads thereon, the threads comprising a strength of about 1200 MPa to 1400 MPa; and
    a rotational drive mechanism comprising a hexagonal shape integrally formed from the flat stock of metal material and an inner spline recess formed from the head or the elongated and hollow shaft, and configured to facilitate tightening of the hollow screw by way of the threads.

41. The hollow screw of claim 40, including a skirt formed from the flat stock of metal material and extending outwardly from the head and terminating in a radially outwardly extending flange and a captive washer at least partially formed around the radially outwardly extending flange in a manner permitting free rotation of the captive washer relative to the radially outwardly extending flange, the head and the elongated and hollow shaft.

42. The hollow screw of claim 41, wherein an outer rim of the captive washer is turned upwardly and around an outer periphery of the radially outwardly extending flange to adjacently couple the captive washer to the radially outwardly extending flange.

43. The hollow screw of claim 41, wherein the captive washer comprises a thickness of about 0.15 to 0.30 millimeters.

44. The hollow screw of claim 41, wherein the captive washer comprises a conductive material.

45. The hollow screw of claim 40, including a free floating washer slidable along the shank portion and captive between the radially outwardly extending flange and the plurality of threads, the threaded portion having an outer diameter relatively larger than an outer diameter of the shank portion.

46. The hollow screw of claim 40, wherein the flat stock of metal material comprises a corrosion resistant metal material comprising A286 steel.

47. The hollow screw of claim 40, including a nose formed at an end of the elongated and hollow shaft opposite the head.

48. The hollow screw of claim 40, wherein the head comprises a rounded head or a flat head.

49. The hollow screw of claim 40, wherein the elongated and hollow shaft includes a cap preventing fluid flow through an interior of the hollow screw.

50. The hollow screw of claim 40, wherein the weight of the hollow screw is approximately ½ the weight of a solid screw of similar size and shape.

51. A hollow screw, comprising:
    a head formed from a flat stock of metal material;
    an elongated and hollow shaft formed from the flat stock of metal material and integrally extending from the head, the elongated and hollow shaft including a shank portion and a threaded portion having a plurality of threads thereon; and
    a rotational drive mechanism comprising a hexagonal shape integrally formed from the flat stock of metal material and an inner spline recess formed from the head or the elongated and hollow shaft, and configured to facilitate tightening of the hollow screw by way of the threads, the weight of the hollow screw comprising approximately ½ the weight of a solid screw of similar size and shape.

52. The hollow screw of claim 51, including a skirt formed from the flat stock of metal material and extending outwardly from the head and terminating in a radially outwardly extending flange and a captive washer at least partially formed around the radially outwardly extending flange in a manner permitting free rotation of the captive washer relative to the radially outwardly extending flange, the head and the elongated and hollow shaft.

53. The hollow screw of claim 52, wherein an outer rim of the captive washer is turned upwardly and around an outer periphery of the radially outwardly extending flange to adjacently couple the captive washer to the radially outwardly extending flange.

54. The hollow screw of claim 52, wherein the captive washer comprises a thickness of about 0.15 to 0.30 millimeters.

55. The hollow screw of claim 52, wherein the captive washer comprises a conductive material.

56. The hollow screw of claim 51, including a free floating washer slidable along the shank portion and captive between the radially outwardly extending flange and the plurality of threads, the threaded portion having an outer diameter relatively larger than an outer diameter of the shank portion.

57. The hollow screw of claim 51, wherein the flat stock of metal material comprises a corrosion resistant metal material comprising A286 steel.

58. The hollow screw of claim 51, including a nose formed at an end of the elongated and hollow shaft opposite the head.

59. The hollow screw of claim 51, wherein the head comprises a rounded head or a flat head.

60. The hollow screw of claim 51, wherein the elongated and hollow shaft includes a cap preventing fluid flow through an interior of the hollow screw.

61. A hollow screw, comprising:
a head formed from a flat stock of metal material;
an elongated and hollow shaft formed from the flat stock of metal material and integrally extending from the head, the elongated and hollow shaft including a shank portion and a threaded portion having a plurality of threads thereon;
an integral washer formed from the flat stock of metal material and having an enlarged horizontal surface area radially extending outwardly from the head;
a captive washer positioned underneath the enlarged horizontal surface area and having an outer rim bent generally about an outer periphery of the integral washer at least partially sandwiching the integral washer therein, the captive washer being freely rotatable relative to the integral washer; and
a rotational drive mechanism integrally formed from the flat stock of metal material and comprising an inner spline recess formed from the head, and configured to facilitate tightening of the hollow screw by way of the threads.

62. The hollow screw of claim 61, wherein the shank portion and the threaded portion of the elongated and hollow shaft comprise a wall thickness between about 0.2 to about 0.7 millimeters and the captive washer comprises a conductive material having a thickness of about 0.15 to 0.30 millimeters.

63. The hollow screw of claim 61, wherein the rotational drive mechanism comprises an outer polygonal shape formed into the head from the flat stock of metal material.

64. The hollow screw of claim 61, wherein the rotational drive mechanism comprises an inner recess stamped into the head from the flat stock of metal material.

65. The hollow screw of claim 61, wherein the flat stock of metal material comprises a corrosion resistant metal material comprising A286 steel.

66. The hollow screw of claim 61, wherein the threads comprise a strength of about 1200 MPa to 1400 MPa.

67. The hollow screw of claim 61, including a nose formed at one end of the elongated and hollow shaft, wherein the head comprises a round head or a flat head.

68. The hollow screw of claim 61, wherein the elongated and hollow shaft includes a cap configured to prevent flow through the hollow screw.

69. The hollow screw of claim 61, wherein the threaded portion is relatively longer than the shank portion, and the threads have a major diameter relatively larger than an outer diameter of the shank portion.

70. The hollow screw of claim 61, including a wave washer sandwiched by the captive washer and the enlarged horizontal surface area of the integral washer.

71. A hollow screw, comprising:
a head formed from a flat stock of metal material;
an elongated and hollow shaft formed from the flat stock of metal material and integrally extending from the head, the elongated and hollow shaft including a shank portion and a threaded portion having a plurality of threads thereon;
an integral washer formed from the flat stock of metal material and having an enlarged horizontal surface area radially extending outwardly from the head;
a captive washer positioned underneath the enlarged horizontal surface area and having an outer rim bent generally about an outer periphery of the integral washer at least partially sandwiching the integral washer therein, the captive washer being freely rotatable relative to the integral washer; and
a rotational drive mechanism integrally formed from the flat stock of metal material and coupled with the head or at least a portion of the elongated and hollow shaft, and configured to facilitate tightening of the hollow screw by way of the threads, wherein the threaded portion is relatively longer than the shank portion, and the threads have a major diameter relatively larger than an outer diameter of the shank portion.

72. The hollow screw of claim 71, wherein the shank portion and the threaded portion of the elongated and hollow shaft comprise a wall thickness between about 0.2 to about 0.7 millimeters and the captive washer comprises a conductive material having a thickness of about 0.15 to 0.30 millimeters.

73. The hollow screw of claim 71, wherein the rotational drive mechanism comprises an outer polygonal shape formed into the head from the flat stock of metal material.

74. The hollow screw of claim 71, wherein the rotational drive mechanism comprises an inner recess formed from the head.

75. The hollow screw of claim 71, wherein the rotational drive mechanism comprises an inner recess stamped into the head from the flat stock of metal material.

76. The hollow screw of claim 71, wherein the flat stock of metal material comprises a corrosion resistant metal material comprising A286 steel.

77. The hollow screw of claim 71, wherein the threads comprise a strength of about 1200 MPa to 1400 MPa.

78. The hollow screw of claim 71, including a nose formed at one end of the elongated and hollow shaft, wherein the head comprises a round head or a flat head.

79. The hollow screw of claim 71, wherein the elongated and hollow shaft includes a cap configured to prevent flow through the hollow screw.

80. The hollow screw of claim 71, including a wave washer sandwiched by the captive washer and the enlarged horizontal surface area of the integral washer.

81. A hollow screw, comprising:
a head formed from a flat stock of metal material;
an elongated and hollow shaft formed from the flat stock of metal material and integrally extending from the head, the elongated and hollow shaft including a shank portion and a threaded portion having a plurality of threads thereon;
an integral washer formed from the flat stock of metal material and having an enlarged horizontal surface area radially extending outwardly from the head;
a captive washer positioned underneath the enlarged horizontal surface area and having an outer rim bent generally about an outer periphery of the integral washer at least partially sandwiching the integral washer therein, the captive washer being freely rotatable relative to the integral washer;
a rotational drive mechanism integrally formed from the flat stock of metal material and coupled with the head or at least a portion of the elongated and hollow shaft, and configured to facilitate tightening of the hollow screw by way of the threads; and
a wave washer sandwiched by the captive washer and the enlarged horizontal surface area of the integral washer.

82. The hollow screw of claim 81, wherein the shank portion and the threaded portion of the elongated and hollow shaft comprise a wall thickness between about 0.2 to about 0.7 millimeters and the captive washer comprises a conductive material having a thickness of about 0.15 to 0.30 millimeters.

83. The hollow screw of claim 81, wherein the rotational drive mechanism comprises an outer polygonal shape formed into the head from the flat stock of metal material.

84. The hollow screw of claim 81, wherein the rotational drive mechanism comprises an inner recess formed from the head.

85. The hollow screw of claim 84, wherein the inner recess comprises a spline recess.

86. The hollow screw of claim 81, wherein the flat stock of metal material comprises a corrosion resistant metal material comprising A286 steel.

87. The hollow screw of claim 81, wherein the threads comprise a strength of about 1200 MPa to 1400 MPa.

88. The hollow screw of claim 81, including a nose formed at one end of the elongated and hollow shaft, wherein the head comprises a round head or a flat head.

89. The hollow screw of claim 81, wherein the elongated and hollow shaft includes a cap configured to prevent flow through the hollow screw.

90. A hollow screw, comprising:
a head formed from a flat stock of metal material;
an integral washer formed from the flat stock of metal material and extending outwardly from the head;
an elongated and hollow shaft formed from the flat stock of metal material and integrally extending from the head, the elongated and hollow shaft including a shank portion and a threaded portion having a plurality of threads thereon; and
a rotational drive mechanism comprising a polygonal shape formed from the flat stock of metal material and coupled with the head or the elongated and hollow shaft, and configured to facilitate tightening of the hollow screw by way of the threads; and
wherein the mass of the hollow screw is at least approximately ½ the mass of a solid screw of similar size and shape.

91. The hollow screw of claim 90, including a captive washer at least partially formed around the integral washer in a manner permitting free rotation of the captive washer relative to the integral washer, the head and the elongated and hollow shaft.

92. The hollow screw of claim 91, wherein an outer rim of the captive washer is turned upwardly and around an outer periphery of the integral washer to adjacently couple the captive washer to the integral washer.

93. The hollow screw of claim 91, wherein the captive washer comprises a thickness of about 0.15 to 0.30 millimeters.

94. The hollow screw of claim 91, wherein the captive washer comprises a conductive material.

95. The hollow screw of claim 90, including a free floating washer slidable along the shank portion and captive between the integral washer and the plurality of threads, the threaded portion having an outer diameter relatively larger than an outer diameter of the shank portion.

96. The hollow screw of claim 90, wherein the rotational drive mechanism comprises the polygonal shape and an inner recess formed from the head.

97. The hollow screw of claim 96, wherein the polygonal shape comprises a hexagon and the inner recess comprises a spline recess.

98. The hollow screw of claim 90, wherein the flat stock of metal material comprises a corrosion resistant metal material comprising A286 steel.

99. The hollow screw of claim 90, wherein the threads comprise a strength of about 1200 MPa to 1400 MPa.

100. The hollow screw of claim 90, including a nose formed at an end of the elongated and hollow shaft opposite the head.

101. The hollow screw of claim 90, wherein the head comprises a rounded head or a flat head.

102. The hollow screw of claim 90, wherein the elongated and hollow shaft includes a cap preventing fluid flow through an interior of the hollow screw.

* * * * *